United States Patent
Wang et al.

(10) Patent No.: US 12,149,341 B2
(45) Date of Patent: Nov. 19, 2024

(54) 5G SYSTEM SIGNALING METHODS TO CONVEY TSN SYNCHRONIZATION INFORMATION

(71) Applicant: TELEFONAKTIEBOLAGET LM ERICSSON (PUBL), Stockholm (SE)

(72) Inventors: Kun Wang, Solna (SE); John Walter Diachina, Garner, NC (US); Paul Schliwa-Bertling, Ljungsbro (SE); Magnus Sandgren, Staffanstorp (SE); Stefano Ruffini, Rome (IT); Joachim Sachs, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 81 days.

(21) Appl. No.: 17/608,462

(22) PCT Filed: May 1, 2020

(86) PCT No.: PCT/IB2020/054151
§ 371 (c)(1),
(2) Date: Nov. 2, 2021

(87) PCT Pub. No.: WO2020/222197
PCT Pub. Date: Nov. 5, 2020

(65) Prior Publication Data
US 2022/0216932 A1    Jul. 7, 2022

Related U.S. Application Data

(60) Provisional application No. 62/842,232, filed on May 2, 2019.

(51) Int. Cl.
*H04J 3/06* (2006.01)
*H04W 56/00* (2009.01)

(52) U.S. Cl.
CPC ....... *H04J 3/0667* (2013.01); *H04W 56/0015* (2013.01)

(58) Field of Classification Search
None
See application file for complete search history.

(56) References Cited

U.S. PATENT DOCUMENTS

| | | | |
|---|---|---|---|
| 2020/0267673 A1* | 8/2020 | Joseph | H04L 69/28 |
| 2022/0095153 A1* | 3/2022 | Ha | H04W 28/24 |
| 2022/0338142 A1* | 10/2022 | Minokuchi | H04J 3/12 |

FOREIGN PATENT DOCUMENTS

| | | |
|---|---|---|
| WO | 2020111994 A1 | 6/2020 |
| WO | 2020111995 A1 | 6/2020 |

OTHER PUBLICATIONS

International Search Report and Written Opinion of the International Searching Authority mailed Aug. 28, 2020 for PCT/IB2020/054151, 15 pages.

(Continued)

*Primary Examiner* — Hong Shao
(74) *Attorney, Agent, or Firm* — Sage Patent Group

(57) ABSTRACT

Systems and methods related to conveying Time Sensitive Networking (TSN) synchronization information within a cellular communication system (e.g., a Fifth Generation System (5GS)) are disclosed. In one embodiment, a method performed by a User Equipment (UE) in a cellular communications system or a TSN Translator (TT) associated with the UE comprises receiving, from a TSN end station, a Precision Time Protocol (PTP) or generalized PTP (gPTP) announce message comprising information that identifies one or more clock domains for which the TSN end station desires to receive PTP or gPTP messages. The method further comprises sending, to a core network node in the cellular communications system, either: (a) the information that identifies the one or more clock domains extracted from (Continued)

the PTP or gPTP announce message or (b) the PTP or gPTP announce message. Using this information, UE specific PTP or gPTP message filtering may be applied.

9 Claims, 15 Drawing Sheets

(56) References Cited

OTHER PUBLICATIONS

"3rd Generation Partnership Project; Technical Specification Group Services and System Aspects; Study on enhancement of 5G System (5GS) for vertical and Local Area Network (LAN) services (Release 16)"; 3GPP TR 23.734 V16.1.0; Mar. 25, 2019; 111 Pages.
Communication pursuant to Article 94(3) mailed Apr. 10, 2024 for European Patent Application No. 20724585.3, 7 pages.

* cited by examiner

5G SYSTEM SIGNALING METHODS TO CONVEY TSN SYNCHRONIZATION INFORMATION

RELATED APPLICATIONS

This application claims the benefit of provisional patent application Ser. No. 62/842,232, filed May 2, 2019, the disclosure of which is hereby incorporated herein by reference in its entirety.

TECHNICAL FIELD

The present disclosure relates to the operation of a Fifth Generation (5G) System (5GS) as a virtual Time Sensitive Networking (TSN) bridge.

BACKGROUND

In regard to time synchronization in Fifth Generation (5G) to support Time Sensitive Networking (TSN), Third Generation Partnership Project (3GPP) Release 16 work is ongoing and different options are being discussed to address the needs for time synchronization as required by TSN and industrial applications. The support of multiple time domains in 5G is especially an open topic.

In 3GPP Technical Report (TR) 23.734, Solution #11 Option 3 provides a solution to support TSN synchronization. The solution is further merged with Solution #28 of TR 3GPP 23.734 [2].

FIG. 1 illustrates an example procedure of supporting multiple TSN domains using a "5G time-aware system", as described in TR 23.734 [2].

1. Left side: During the device onboarding phase, a Protocol Data Unit (PDU) session is established between a User Equipment (UE) and a User Plane Function (UPF).
2. Right side: When incoming (generalized) Precision Time Protocol ((g)PTP) messages arrive at the UPF/TSN Translator (TT), a (g)PTP message contains "domainNumber" which is used to identify the time domain to which the message belongs. The TT makes an ingress timestamp (TSi) for every (g)PTP event message and forwards the message to the UPF. The TSi is stamped according to the 5G system clock (represented in the figures included herein as the clock "C1"). The TSi can be carried in either the suffix or correction Field of the (g)PTP message.
3. The UPF forwards the (g)PTP messages over user plane General Packet Radio Service (GPRS) Tunneling Protocol (GTP) User Data (GTP-U) tunnel, which already exists between the 5G base station (New Radio (NR) base station (gNB)) and the UPF from step 1. That is, the GTP-U tunnel is associated with a PDU Session that has already been established for the target UE and deemed appropriate for conveying gPTP messages as user plane information. The gNB has no knowledge about which UE needs which of the clock domains identified within gPTP messages and simply relays these messages as user plane payload. So, all normal handling in the UPF applies. Note that, as a variation, optimization may be provided by multiplexing several user plane packets (gPTP messages) into one 5G system user plane packet in order to reduce the number of packets sent over the radio interface.
4. The UE receives user plane packets (gPTP messages) over the radio interface and forwards them to the TT at the UE side.
5. To modify gPTP messages to reflect the 5G System (5GS) residence time, the TT/UE will need to filter out gPTP messages from other types of user plane traffic, for example, by checking the Ethernet header.
6. The TT/UE timestamps every gPTP event message with an egress timestamp (TSe) using the 5G reference clock. Note that the 5G reference clock is denoted as "C1" (i.e., the reference clock domain). Similarly, in the figures included herein, other clock domains are denoted as, e.g., "C2", "C3", etc.
7. The TT/UE calculates the 5GS residence time (T_residence) according to the difference between the TSe and TSi, T_residence=TSe-TSi.
8. The TT/UE modifies the gPTP message (received from the UE) to include the "T_residence". The modified gPTP message is forwarded to the End Station.
9. The End Station receives the gPTP messages from all clock domains, e.g. gPTP msg1 and gPTP msg2. The End Station can pick up the wanted "time domain" (selects the gPTP using "domainNumber" inside the gPTP message) to use according to application needs.

Patent Cooperation Treat (PCT) application PCT/SE2019/051018, which has a priority date of Nov. 26, 2018 and is referred to herein as Prior Application #1, addressed the delivery of synchronization messages (g)PTP using 5G Radio Access Network (RAN) signaling (System Information Block (SIB)/Radio Resource Control (RRC) signaling).

PCT application PCT/SE2019/051013, which has a priority date of Nov. 27, 2018 and is referred to herein as Prior Application #2, addressed conveying synchronization messages (g)PTP using a user plane PDU session. This prior provisional patent application proposed methods for filtering different "domainNumbers" from gPTP messages so that transmission of the (g)PTP can be specifically according to only the "domain" desired by the UE.

SUMMARY

Systems and methods related to conveying Time Sensitive Networking (TSN) synchronization information within a cellular communication system (e.g., a Fifth Generation System (5GS)) are disclosed. In one embodiment, a method performed by a User Equipment (UE) in a cellular communications system or a TSN Translator (TT) associated with the UE comprises receiving, from a TSN end station, a Precision Time Protocol (PTP) or generalized PTP (gPTP) announce message comprising information that identifies one or more clock domains for which the TSN end station desires to receive PTP or gPTP messages. The method further comprises sending, to a core network node in the cellular communications system, either: (a) the information that identifies the one or more clock domains extracted from the PTP or gPTP announce message or (b) the PTP or gPTP announce message. Using this information, UE specific PTP or gPTP message filtering may be applied to thereby ensure clock domain information from the TSN network within the context of PTP or gPTP messages is only relayed to any given UE/TT if that UE/TT supports a TSN end station that has an interest in the corresponding clock domain. This can result is substantial savings in the amount of radio interface bandwidth used in support of transmitting PTP or gPTP messages to UEs.

In one embodiment, the information that identifies the one or more clock domains comprises one or more wanted domain numbers that identify the one or more clock domains for which the TSN end station desires to receive PTP or gPTP messages.

In one embodiment, sending either (a) or (b) comprises sending either (a) or (b) via either control plane signaling or a user plane message(s).

In one embodiment, the method further comprises extracting the information that identifies the one or more clock domains from the PTP or gPTP announce message. The step of sending either (a) or (b) comprises sending the information that identifies the one or more clock domains extracted from the PTP or gPTP message. In one embodiment, the UE or TT terminates the PTP or gPTP announce message. In one embodiment, sending the information that identifies the one or more clock domains extracted from the PTP or gPTP message comprises sending the information that identifies the one or more clock domains extracted from the PTP or gPTP message via control plane signaling in a new information element. In another embodiment, sending the information that identifies the one or more clock domains extracted from the PTP or gPTP message comprises sending the information that identifies the one or more clock domains extracted from the PTP or gPTP message in a payload of a user plane message. In another embodiment, sending the information that identifies the one or more clock domains extracted from the PTP or gPTP message comprises sending the information that identifies the one or more clock domains extracted from the PTP or gPTP message in a header of a user plane message.

In one embodiment, sending either (a) or (b) comprises sending the PTP or gPTP announce message via control plane signaling.

In one embodiment, sending either (a) or (b) comprises encapsulating the PTP or gPTP announce message into a user plane Protocol Data Unit (PDU) payload of a user plane message and sending the user plane message.

Corresponding embodiments of a node for a cellular communications system that operates as a virtual TSN bridge node being either a UE or a TT at the UE are also disclosed. In one embodiment, the node is adapted to receive, from a TSN end station, a PTP or gPTP announce message comprising information that identifies one or more clock domains for which the TSN end station desires to receive PTP or gPTP messages. The node is further adapted to send, to a core network node in the cellular communications system, either: (a) the information that identifies the one or more clock domains extracted from the PTP or gPTP announce message or (b) the PTP or gPTP announce message.

In one embodiment, a node for a cellular communications system that operates as a virtual TSN bridge node being either a UE or a TT at the UE is provided, where the node comprises processing circuitry adapted to cause the node to receive, from a TSN end station, a PTP or gPTP announce message comprising information that identifies one or more clock domains for which the TSN end station desires to receive PTP or gPTP messages. The processing circuitry is further adapted to cause the node to send, to a core network node in the cellular communications system, either: (a) the information that identifies the one or more clock domains extracted from the PTP or gPTP announce message or (b) the PTP or gPTP announce message.

Embodiments of a method performed by a network node of a cellular communications system that operates to provide support for one or more virtual TSN nodes are also provided. In one embodiment, the method comprises obtaining information that identifies one or more clock domains for which a TSN end station desires to receive PTP or gPTP messages via a UE or TT associated with the UE. The method further comprises performing one or more actions using the obtained information.

In one embodiment, performing the one or more actions comprises providing the information to another network node.

In one embodiment, performing the one or more actions comprises performing clock domain filtering of incoming PTP or gPTP messages from the TSN network such that only PTP or gPGP messages of the one or more clock domains desired by a TSN end station are delivered to the UE or TT associated with the TSN end station.

In one embodiment, the network node is a Session Management Function (SMF) or a Policy Control Function (PCF), and performing the one or more actions comprises modifying a corresponding Protocol Data Unit (PDU) session such that a corresponding User Plane Function (UPF) only routes PTP or gPTP messages of the one or more clock domains to the UE or TT associated with the TSN end station.

In one embodiment, the network node is a SMF or PCF, and performing the one or more actions comprises sending the information to a corresponding UPF.

In one embodiment, the network node is a SMF, and performing the one or more actions comprises instructing a corresponding UPF to forward PTP or gPTP messages to a corresponding base station using a dedicated tunnel between the base station and the UPF. In one embodiment, the PTP or gPTP messages that the corresponding base station is to support comprises PTP or gPTP messages of the one or more clock domains.

In one embodiment, the network node is a base station, and performing the one or more actions comprises performing clock domain filtering of PTP or gPTP messages at the base station.

In one embodiment, the network node is a UPF, and performing the one or more actions comprises performing clock domain filtering of PTP or gPTP messages at the UPF.

In one embodiment, the network node is a UPF, and performing the one or more actions comprises sending the information to another network node.

In one embodiment, obtaining the information comprises obtaining the information from a Centralized Network Configuration (CNC) of an associated TSN network via an Application Function (AF).

In one embodiment, obtaining the information comprises receiving either: a control plane signaling message comprising the information or a user plane message comprising the information.

In one embodiment, obtaining the information comprises receiving a control plane signaling message comprising a PTP or gPTP announce message, wherein the PTP or gPTP announce message comprises the information that identifies the one or more clock domains for which the TSN end station desires to receive PTP or gPTP messages.

In one embodiment, obtaining the information comprises receiving a user plane message comprising the information in a payload of the user plane message.

In one embodiment, obtaining the information comprises receiving a user plane message comprising the information in a header of the user plane message.

Corresponding embodiments of a network node are also disclosed. In one embodiment, a network node of a cellular communications system that operates to provide support for one or more virtual TSN nodes is provided, wherein the network node is adapted to obtain information that identifies one or more clock domains for which a TSN end station desires to receive PTP or gPTP messages via a UE or TT associated with the UE and perform one or more actions using the obtained information.

In one embodiment, a network node of a cellular communications system that operates to provide support for one or more virtual TSN nodes is provided, wherein the network node comprises processing circuitry configured to cause the network node to obtain information that identifies one or more clock domains for which a TSN end station desires to receive PTP or gPTP messages via a UE or TT associated with the UE and perform one or more actions using the obtained information.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
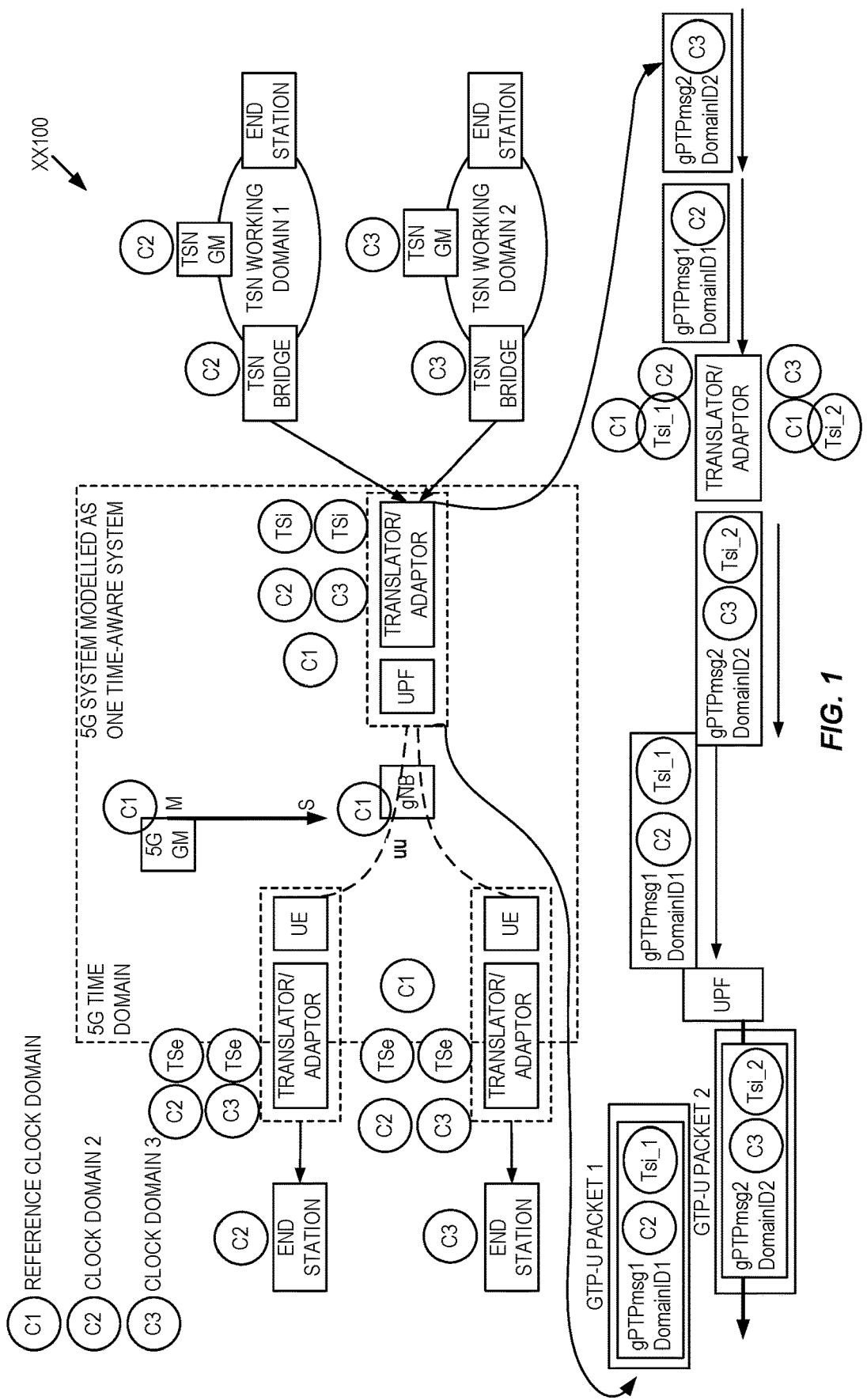
FIG. 1 illustrates an example procedure of supporting multiple Time Sensitive Networking (TSN) domains using a "Fifth Generation (5G) time-aware system", as described in Third Generation Partnership Project (3GPP) Technical Report (TR) 23.734.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment (UE) in a 3GPP network and a Machine Type Communication (MTC) device.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s) related to time synchronization in 5G to support Time Sensitive Networking (TSN). Depending upon how Precision Time Protocol (PTP) or generalized Precision Time Protocol (gPTP) frames or messages are transported in the 5G system (5GS) and especially what transmission type (broadcast, multicast, unicast) is chosen at the RAN, RAN knowledge about what time or clock domain is needed by each UE may be very important, but is not supported today. For multicast and unicast based transmission methods in particular, the volume of TSN time domain related information sent over the radio interface could be significantly reduced if the RAN was provided with this knowledge.

The following problems are addressed herein:
1. Prior Application #2 proposed that the end station can report its interested time domain through the (g)PTP announce message. However, there is still a need for systems and methods for how the UE can relay such information to the relevant 5G nodes to perform the "domain Filtering". This corresponds to FIG. 1, step 1.
2. Prior Application #2 proposed a way for the end station to report its interested time domain through the (g)PTP announce message. However, there is still a need for other ways to do it. This corresponds to FIG. 1, step 1.
3. Prior Application #2 described that a node in 5GS could learn which UE and which end stations behind a UE are interested in which gPTP messages ("domainNumber") and establish, for example, rules for routing incoming gPTP frames accordingly. However, there is still a need for signaling methods for delivering UE/end station specific domainNumber information of interest.
4. FIG. 1 describes a 5G signaling method to convey the timing information (i.e., clock information). However, the method is not optimized, and it only covers a limited case. Signaling methods for advanced filtering of domainNumbers at different 5GS nodes are not covered.

Certain aspects of the present disclosure and their embodiments may provide solutions to the aforementioned or other challenges. In some embodiments, a method is described that is not limited to only conveying UE or end station specific "domainNumber" information. The method can be applied for other external network related parameters.

Certain embodiments may provide one or more of the following technical advantage(s). For example, in some embodiments, UE specific gPTP message filtering may be applied at the UPF to thereby ensure clock domain information received by the UPF/TSN Translator (TT) (from the TSN network) within the context of gPTP messages is only relayed to any given UE if it has an interest in the corresponding clock domain indicated by the DomainNumber field of gPTP messages. This can result in a substantial savings in the amount of radio interface bandwidth used in support of transmitting gPTP messages to UEs.

As another example, in some embodiments, gPTP message filtering may be applied at the gNB to thereby ensure clock domain information received by the gNB from the UPF/TT within the context of gPTP messages is only relayed over the radio interface if there is at least one UE that has an interest in the corresponding clock domain indicated by the DomainNumber field of gPTP messages. This can result in a substantial savings in the amount of radio interface bandwidth used in support of transmitting gPTP messages to UEs.

As another example, supporting a mobility case, embodiments of the present disclosure allow a mobile UE or mobile end station to freely move among different cells. Embodiments described herein dynamically support the efficient redistribution of domain numbers to the UE/mobile end station regardless of the UE/mobile end station location.

As another example, embodiments of the present disclosure support the mobility case, where UE or mobile end station needs to merge time domains. An application may need an end station to change domain numbers (e.g., merged working domain case described in 3GPP Technical Specification (TS) 22.104). Embodiments of the present disclosure allow a UE/end station to dynamically get a corresponding domain number that an application may need in an efficient manner.

Figure 2:
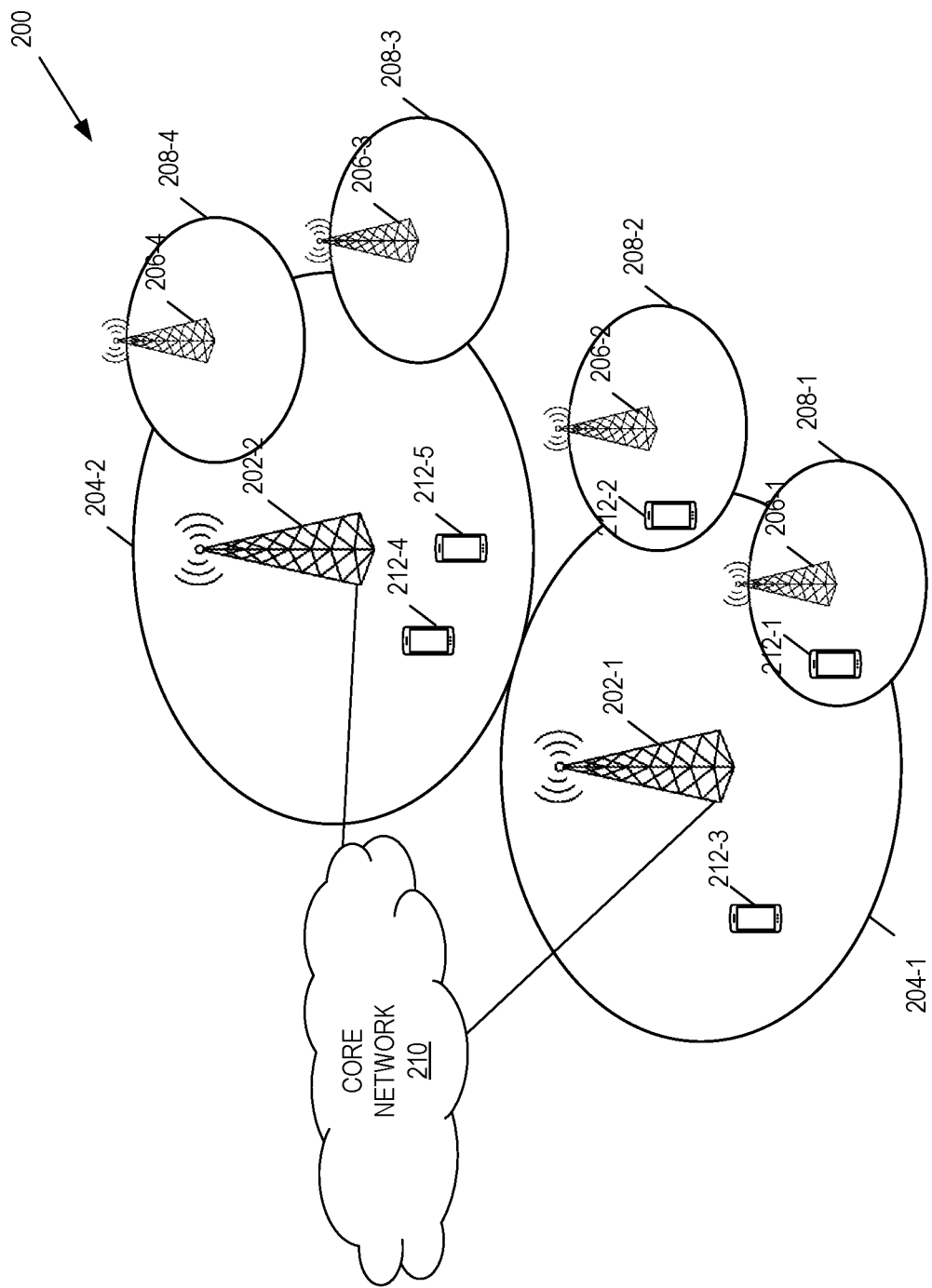
FIG. 2 illustrates one example of a cellular communications system in which embodiments of the present disclosure may be implemented.

Embodiments described herein relate to using the 5GS as a virtual TSN node(s). Thus, before describing embodiments of the present disclosure in more detail, a brief discussion of a 5GS is beneficial. In this regard, FIG. 2 illustrates one example of a cellular communications network 200 according to some embodiments of the present disclosure. In the embodiments described herein, the cellular communications network 200 is a 5G NR network. In this example, the cellular communications network 200 includes base stations 202-1 and 202-2, which in 5G NR are referred to as gNBs, controlling corresponding macro cells 204-1 and 204-2. The base stations 202-1 and 202-2 are generally referred to herein collectively as base stations 202 and individually as base station 202. Likewise, the macro cells 204-1 and 204-2 are generally referred to herein collectively as macro cells 204 and individually as macro cell 204. The cellular communications network 200 may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The base stations 202 (and optionally the low power nodes 206) are connected to a core network 210.

The base stations 202 and the low power nodes 206 provide service to wireless devices 212-1 through 212-5 in the corresponding cells 204 and 208. The wireless devices 212-1 through 212-5 are generally referred to herein collectively as wireless devices 212 and individually as wireless device 212. The wireless devices 212 are also sometimes referred to herein as UEs.

Figure 3:
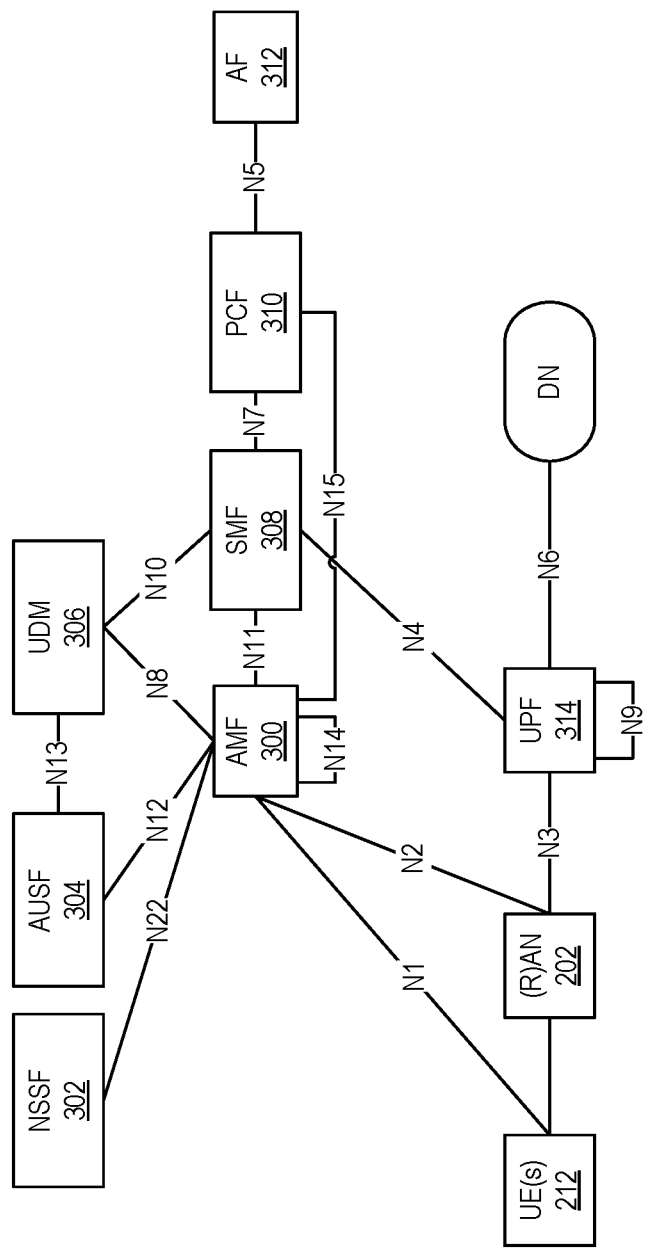
FIG. 3 illustrates a wireless communication system represented as a 5G network architecture composed of core Network Functions (NFs), where interaction between any two NFs is represented by a point-to-point reference point/interface.

FIG. 3 illustrates a wireless communication system represented as a 5G network architecture composed of core Network Functions (NFs), where interaction between any two NFs is represented by a point-to-point reference point/interface. FIG. 3 can be viewed as one particular implementation of the system 200 of FIG. 2.

Seen from the access side the 5G network architecture shown in FIG. 3 comprises a plurality of UEs 212 connected to either a RAN 202 or an Access Network (AN) as well as an Access and Mobility Function (AMF) 300. Typically, the R(AN) 202 comprises base stations, e.g. such as eNBs or gNBs or similar. Seen from the core network side, the 5G Core (5GC) NFs shown in FIG. 3 include a NSSF 302, an Authentication Server Function (AUSF) 304, a UDM 306, the AMF 300, a Session Management Function (SMF) 308, a PCF 310, and an Application Function (AF) 312.

Reference point representations of the 5G network architecture are used to develop detailed call flows in the normative standardization. The N1 reference point is defined to carry signaling between the UE 212 and AMF 300. The reference points for connecting between the AN 202 and AMF 300 and between the AN 202 and UPF 314 are defined as N2 and N3, respectively. There is a reference point, N11, between the AMF 300 and SMF 308, which implies that the SMF 308 is at least partly controlled by the AMF 300. N4 is used by the SMF 308 and UPF 314 so that the UPF 314 can be set using the control signal generated by the SMF 308, and the UPF 314 can report its state to the SMF 308. N9 is the reference point for the connection between different UPFs 314, and N14 is the reference point connecting between different AMFs 300, respectively. N15 and N7 are defined since the PCF 310 applies policy to the AMF 300 and SMF 308, respectively. N12 is required for the AMF 300 to perform authentication of the UE 212. N8 and N10 are defined because the subscription data of the UE 212 is required for the AMF 300 and SMF 308.

The 5GC network aims at separating user plane and control plane. The user plane carries user traffic while the control plane carries signaling in the network. In FIG. 3, the UPF 314 is in the user plane and all other NFs, i.e., the AMF 300, SMF 308, PCF 310, AF 312, NSSF 302, AUSF 304, and UDM 306, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RU) between UEs and data network for some applications requiring low latency.

The core 5G network architecture is composed of modularized functions. For example, the AMF 300 and SMF 308 are independent functions in the control plane. Separated AMF 300 and SMF 308 allow independent evolution and scaling. Other control plane functions like the PCF 310 and AUSF 304 can be separated as shown in FIG. 3. Modularized function design enables the 5GC network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 4:
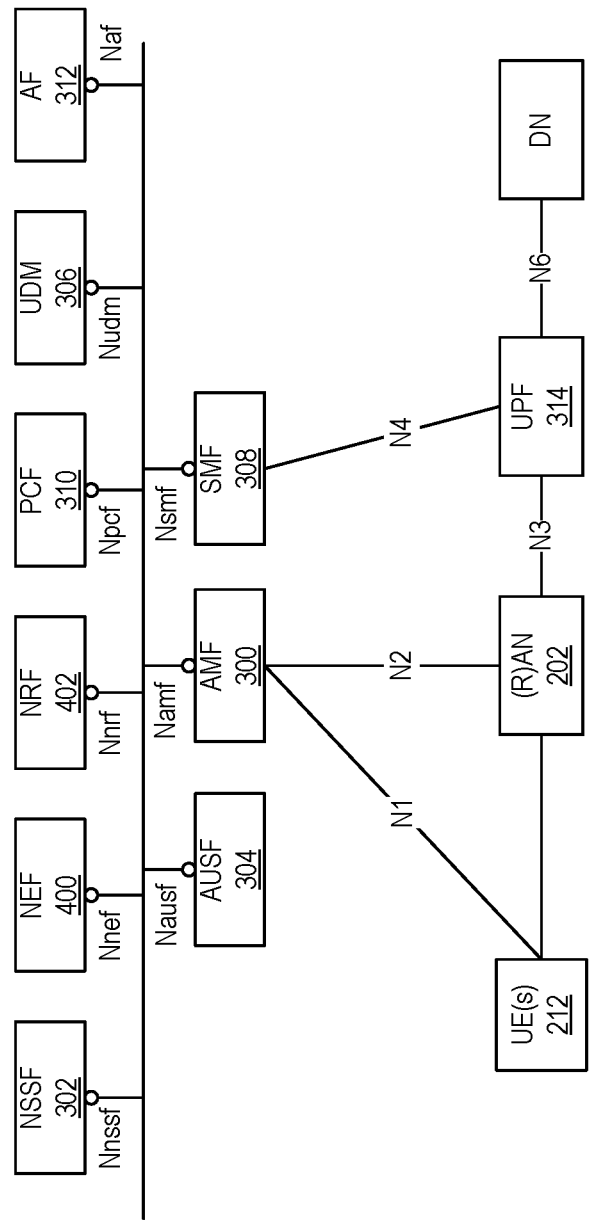
FIG. 4 illustrates a 5G network architecture using service-based interfaces between the NFs in the control plane, instead of the point-to-point reference points/interfaces used in the 5G network architecture of FIG. 3.

FIG. 4 illustrates a 5G network architecture using service-based interfaces between the NFs in the control plane, instead of the point-to-point reference points/interfaces used in the 5G network architecture of FIG. 3. However, the NFs described above with reference to FIG. 3 correspond to the NFs shown in FIG. 4. The service(s) etc. that a NF provides to other authorized NFs can be exposed to the authorized NFs through the service-based interface. In FIG. 4 the service based interfaces are indicated by the letter "N" followed by the name of the NF, e.g. Namf for the service based interface of the AMF 300 and Nsmf for the service based interface of the SMF 308, etc. The NEF 400 and the NRF 402 in FIG. 4 are not shown in FIG. 3 discussed above. However, it should be clarified that all NFs depicted in FIG. 3 can interact with the NEF 400 and the NRF 402 of FIG. 4 as necessary, though not explicitly indicated in FIG. 3.

Some properties of the NFs shown in FIGS. 3 and 4 may be described in the following manner. The AMF 300 provides UE-based authentication, authorization, mobility management, etc. A UE 212 even using multiple access technologies is basically connected to a single AMF 300 because the AMF 300 is independent of the access technologies. The SMF 308 is responsible for session management and allocates Internet Protocol (IP) addresses to UEs. It also selects and controls the UPF 314 for data transfer. If a UE 212 has multiple sessions, different SMFs 308 may be allocated to each session to manage them individually and possibly provide different functionalities per session. The AF 312 provides information on the packet flow to the PCF 310 responsible for policy control in order to support Quality of Service (QoS). Based on the information, the PCF 310 determines policies about mobility and session management to make the AMF 300 and SMF 308 operate properly. The AUSF 304 supports authentication function for UEs or similar and thus stores data for authentication of UEs or similar while the UDM 306 stores subscription data of the UE 212. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 5:
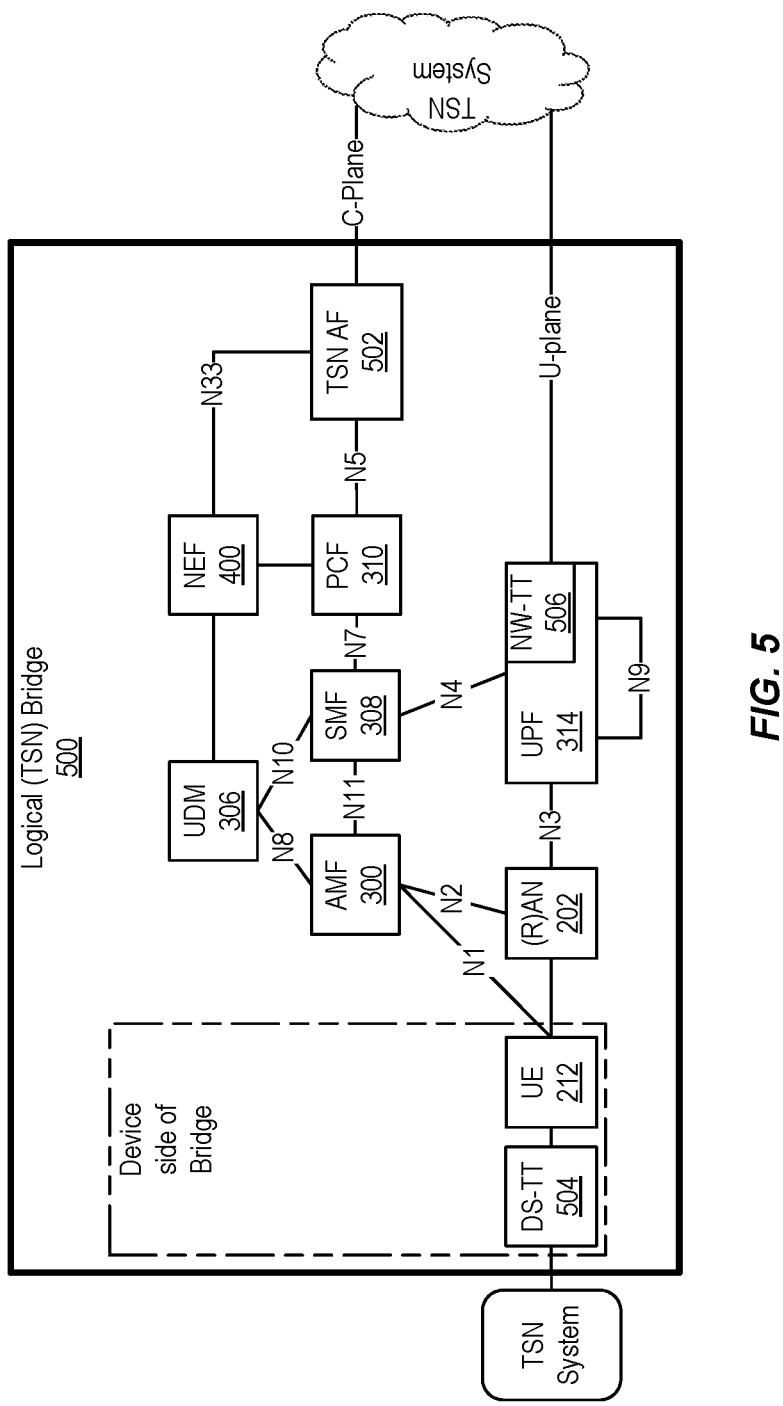
FIG. 5 shows one example of an architecture in which a 5G System (5GS) appears as a TSN bridge.

Embodiments of the present disclosure more specifically relate to the 5GS appearing as a TSN bridge for integration with a TSN. In this regard, FIG. 5, which is a reproduction of FIG. 4.4.8.2-1 of Change Request (CR) S2-1906754 for 3GPP TS 23.501, shows one example of an architecture in which a 5GS appears as a TSN bridge 500. The architecture includes a TSN AF 502, a device side TT (DS-TT) 504, and a network side TT (NW-TT) 506. In this example, the TT at the UE side, which is denoted in FIG. 5 as the DS-TT 504 and also referred to herein as a UE side TT or UE/TT, is shown outside of the UE 212, and the TT at the UPF side, which is denoted in FIG. 5 as the NW-TT 506 and also referred to herein as a UPF side TT or UPF/TT, is shown inside of the UPF 314. However, in other embodiments, the DS-TT 504 at the UE side is alternatively implemented within the UE 212 and/or the NW-TT 506 at the UPF side is alternatively implemented outside of the UPF 314.

Now, turning to some example embodiments of the present disclosure. Here, example embodiments are described for addressing Problems 1-3 described above. Note that while these embodiments are described separately for each problem, these solutions may be used independently or in any desired combination.

Embodiments that Address Problem #1

When the UE/TT 504 receives the "wanted domainNumber(s)" from the TSN end station(s) via (g)PTP announce messages, there can be different ways to deliver UE or end station (denoted herein as UE/end station) specific "wanted domainNumber(s)" inside the 5GS. The "wanted domainNumber(s)" is the indication(s) of the clock domain(s) in which the TSN end station(s) is(are) interested.

In some embodiments, a control plane way of delivering information about the clock domain(s) of interest (i.e. "wanted domainNumber(s)") for a given UE 212 (Announce message termination at the UE/TT 504) is provided.

The UE/TT 504 or UE 212 can terminate the gPTP Announce messages, extract the "clock domain info" provided by the domainNumber(s) therein, and then deliver the extracted clock domain info using 5GS control plane signaling. Note that additional information provided by the Announce messages is also used to perform the Best Master Clock Algorithm (BMCA). BMCA is part of the (g)PTP standard (see, e.g., IEEE 1588, clause 6.6.2.3). This is not further addressed by the present disclosure.

Figure 6:
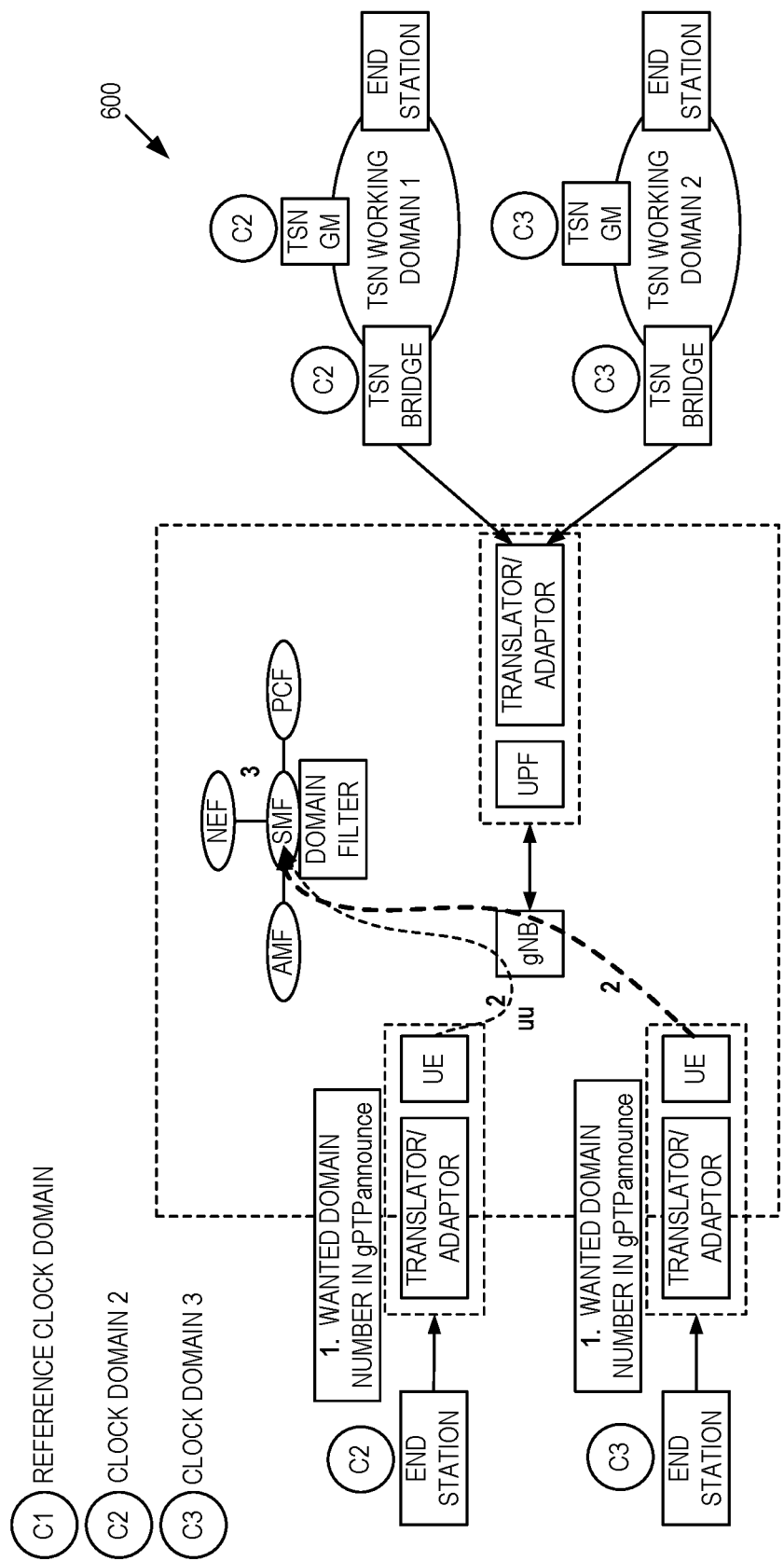
FIG. 6 illustrates one example of a control plane mechanism to convey "wanted domainNumber(s)" in a 5GS in accordance with some embodiments of the present disclosure.
Figure 7A:
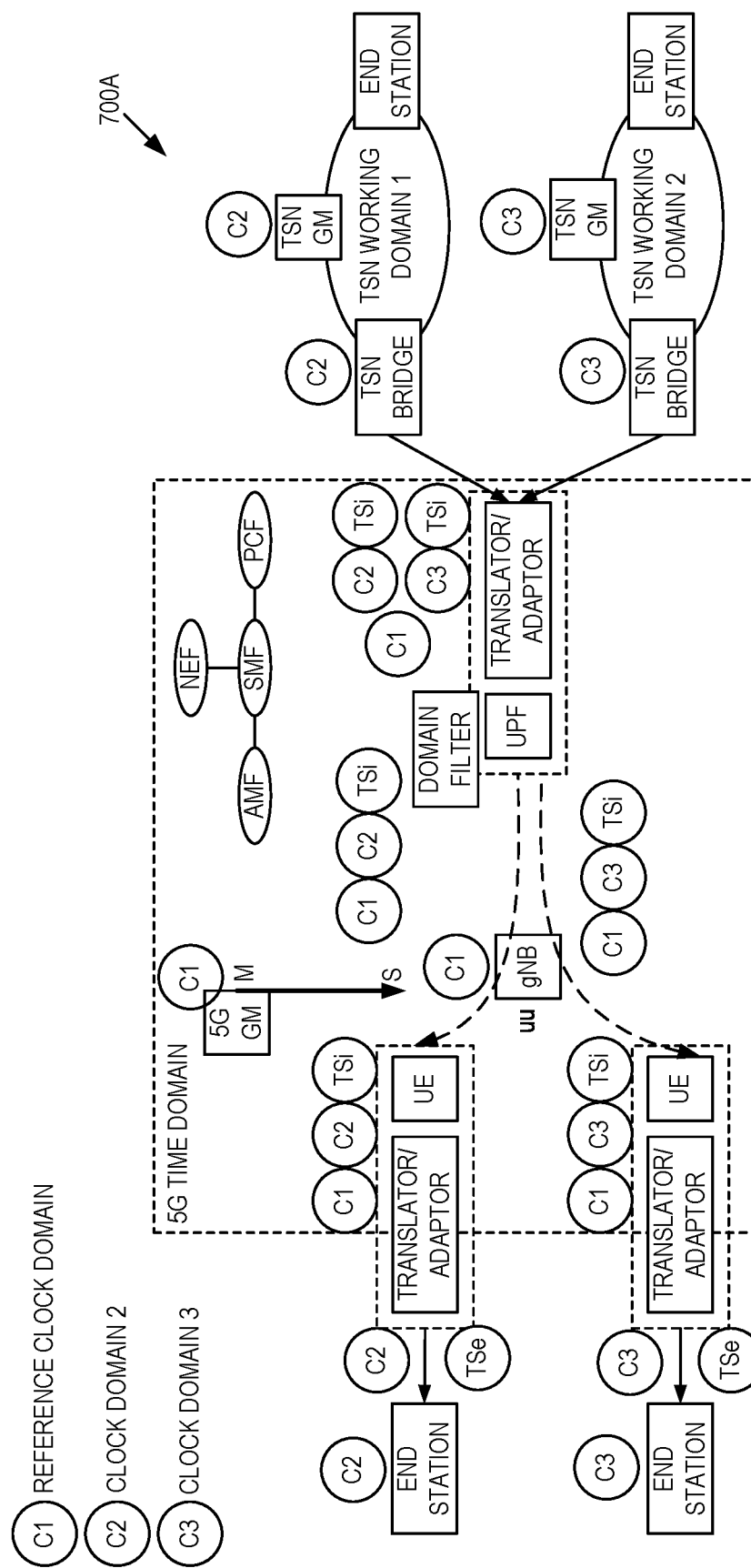
FIGS. 7A and 7B illustrate the use of the "wanted domainNumber(s)" in the 5GS to provide domain filtering in accordance with embodiments of the present disclosure.
Figure 7B:
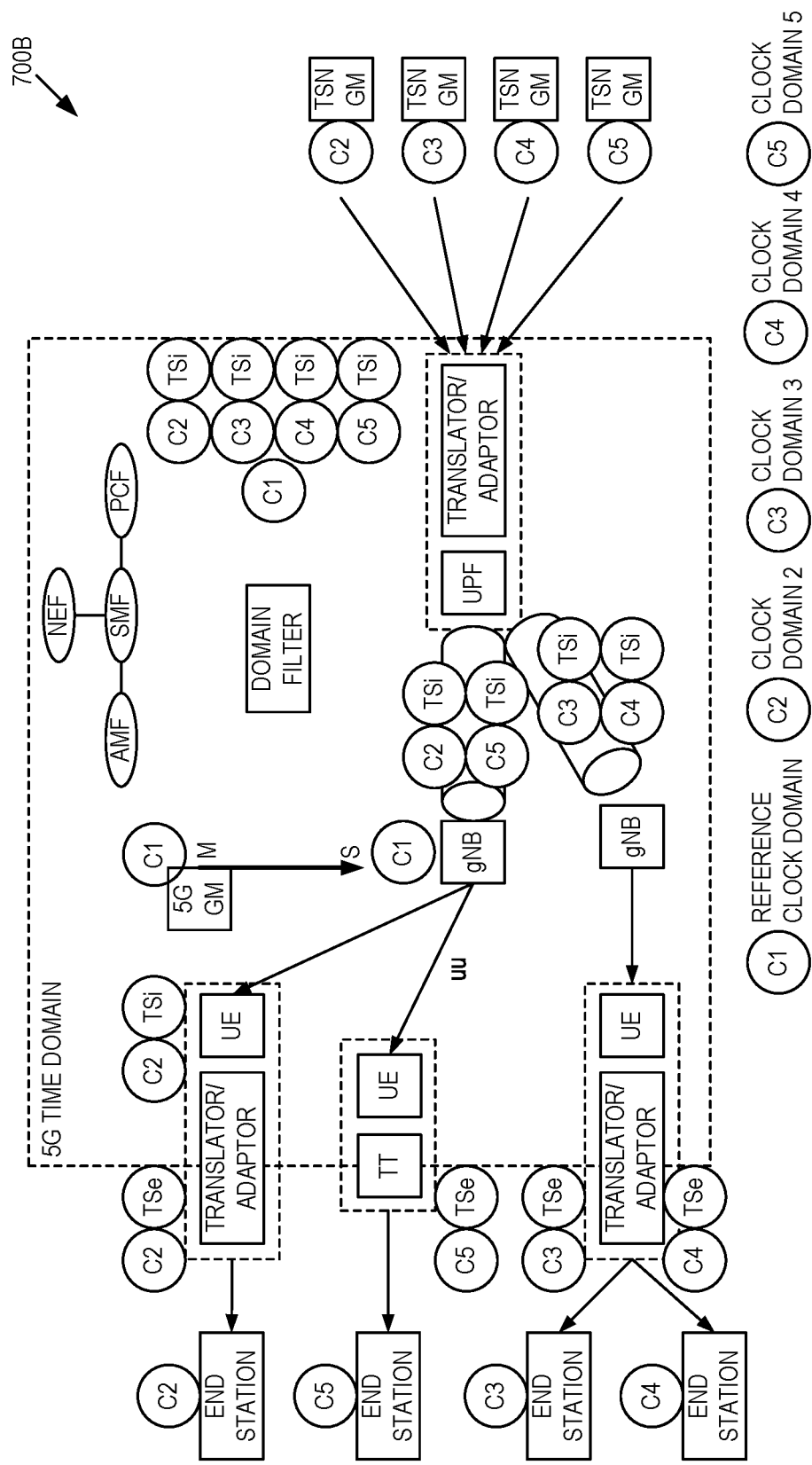

More specifically, FIG. 6 illustrates one example of a control plane way to convey "wanted domainNumber(s)" in 5GS in accordance with some embodiments of the present disclosure. Looking at FIG. 6, the procedure for conveying "wanted domainNumber(s)" in 5GS in accordance with some embodiments of the present disclosure can be described as follows:

1. Left side of FIG. 6: During the device onboarding phase, a PDU session is established between the UE 212 and the UPF 314. End stations report to the UE/TT 504 about their "wanted domainNumber(s)".
2. The "wanted domainNumber(s)" can be conveyed in the 5GS via control plane signaling. For the control plane way, the Announce message termination is at the UE/TT 504. The Announce message exists only between end stations and the UE 212. There is no announce message delivered inside 5GS. The UE/TT 504 extracts the "wanted domainNumber(s)" from the announce message received from the respective end station, adds the "wanted domainNumber(s)" into an Information Element (IE) (e.g., a new IE carried by, e.g., Non-Access Stratum (NAS) signaling, and then delivers the "wanted domainNumber(s)" to the 5GS control plane nodes, e.g. to the SMF 308 via the AMF 300 using NAS (N1) signaling using the PDU session setup/modification procedure.
   Variation 1: Besides "wanted domainNumber(s)", other information, e.g. information required to perform the BMCA, can be extracted and delivered in the 5GS in a manner similar to the delivery of the "wanted domainNumber(s)".
   Variation 2: The whole announce message can be forwarded through the control plane. In this case, rather than extracting the "wanted domain-Number(s)" from the announce message received from the respective end station, the UE/TT 504 forwards the announce message to the SMF 308 via the control plane.
3. The SMF 308 may host the "wanted domain-Number(s)" as shown in FIG. 6, or the SMF 308 can forward the information to other 5GS nodes (e.g., other control plane nodes or user plane nodes), where the information can be used for filtering of the gPTP messages from different "clock domains" (i.e., a 5G node can host the "wanted domainNumber(s)" information but pass this information to other nodes where the gPTP message filtering process is performed). Note that that "wanted domain number" is a piece of information, derived/extracted from the PTP message. A "domain filter" is a kind of database and is stored/hosted in a NF. The "domain filter" is a collection of "wanted domain numbers". As FIG. 6 shows, the "wanted domainNumber(s)" are reported per PDU session. Then, the SMF 308 hosts/stores the complete set of "wanted domainNumbers" for all UEs. So, here, the "wanted domainNumbers" is the same as "domain filter". A "packet filter" is a UPF function to filter out packets according to certain rules, e.g., PDR rules.
   Variation 1: The SMF 308 or the PCF 310 hosts the "wanted domainNumber(s)". The SMF 308 or the PCF 310 modifies the PDU session, e.g. configures a different type of rules to the User Plane, so that the UPF 314 only routes the "wanted domain-Number(s)" to the UE/TT 504 which wants it/them. That is, when the UPF/TT 504 receives incoming (g)PTP messages from the TSN network (right side of FIG. 6), the UPF/TT 504 can then only relay subsequent downlink gPTP messages corresponding to the identified clock domains of interest to UEs, which illustrates a domain filter at the UPF 314 using a dedicated tunnel between the gNB 202 and UPF 314. Note that the domain filter database is stored at the SMF 308 or PCF 310, but a packet filter or PDR rule at the UPF 314 is set by the PCF 310 or SMF 308 to set the desired domains.
   Variation 2: Is this variation, hosting and domain filtering is at the UPF/TT 504. The SMF 308 may directly send "wanted domainNumber(s)" to the UPF 314 via, e.g., N4 session management procedures (i.e., it does not host the "wanted domainNumber(s)"). In this manner, the domain filter database (i.e., the collection of "wanted domainNumber(s)") can be stored at the UPF/TT 504. The UPF/TT 504 can then only relay subsequent downlink gPTP messages corresponding to the identified clock domains of interest to UEs (i.e., identified by "wanted domainNumber(s)"), as shown in FIG. 7A where the domain filter is at the UPF/TT 504.
   Variation 3: In this variation, hosting and domain filtering is at the SMF 308 (see FIG. 7B). The SMF 308 is aware of the exact set of clock domains that a given gNB is to support (i.e., based on the set of UE/end stations managed using that gNB. The SMF 308 instructs the UPF 314 to only forward the gPTP messages (received from the right side of the TSN network) that the gNB is to support using a dedicated tunnel between the gNB 202 and the UPF 314. This tunnel, for example, can be a transport network tunnel for which the corresponding payload (gPTP messages) is not relayed over the radio interface using a Data Radio Bearer (DRB) but the clock domain related information therein is instead relayed to UEs 212 using non-user plane methods. The, gNB 202 can, for example, use System Information Block (SIB) or Radio Resource Control (RRC) to convey the clock domain related information extracted from the gPTP messages it receives from the UPF 314 over this tunnel.
   Variation 4: In this variation, hosting and domain filtering is performed at the RAN. The RAN (i.e., the gNB 202) may receive "wanted domainNumber(s)" corresponding to the set of UEs or end stations that it manages from the SMF 308 or the PCF 310 via N2 procedures, e.g. Next Generation Application Protocol (NGAP). FIG. 9 shows one example of how a RAN (i.e., the gNB 202) can use the domain filter for selective forwarding of gPTP messages (i.e., it only sends those messages having a DomainNumber of interest to at least one UE/TT under its management).
   Variation 5: The UPF directly extracts "wanted domainsNumber(s)" and then at the same time stores/hosts the "domain filter". This is illustrated in FIG. 8.

In some embodiments, the UE/TT 504 or the UE 212 forwards (g)PTP announce messages to the RAN and the UPF 314 via user plane, e.g. in the Packet Data Convergence Protocol (PDCP) and General Packet Radio Service Tunneling Protocol (GTP) User Data (GTP-U) payload associated with a default PDU session. Processing of the BMCA related information is out of the scope of the present disclosure.

Figure 8:
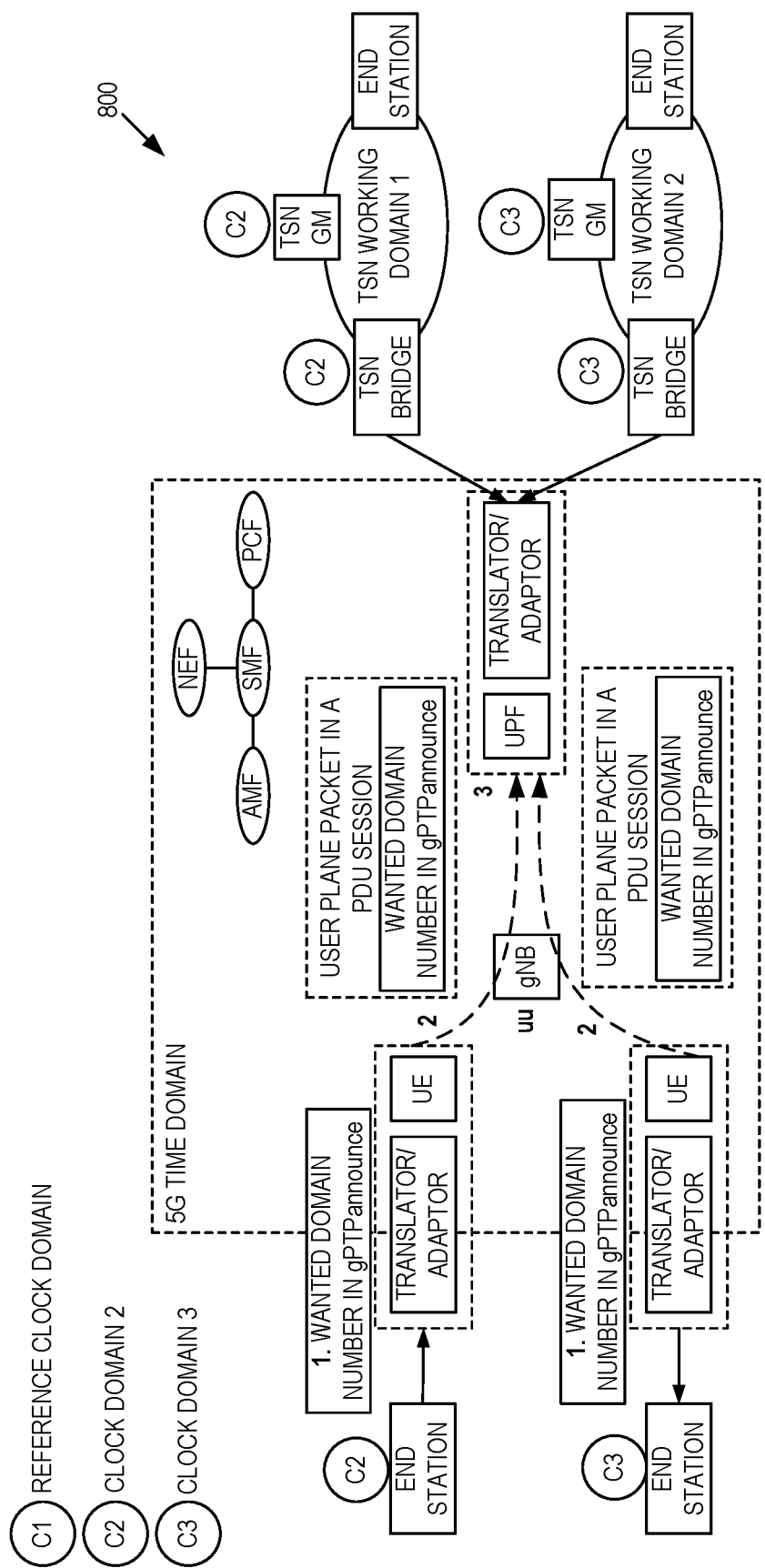
FIG. 8 illustrates one example of a user plane mechanism to convey "wanted domainNumber(s)" in a 5GS in accordance with some embodiments of the present disclosure.
Figure 9:
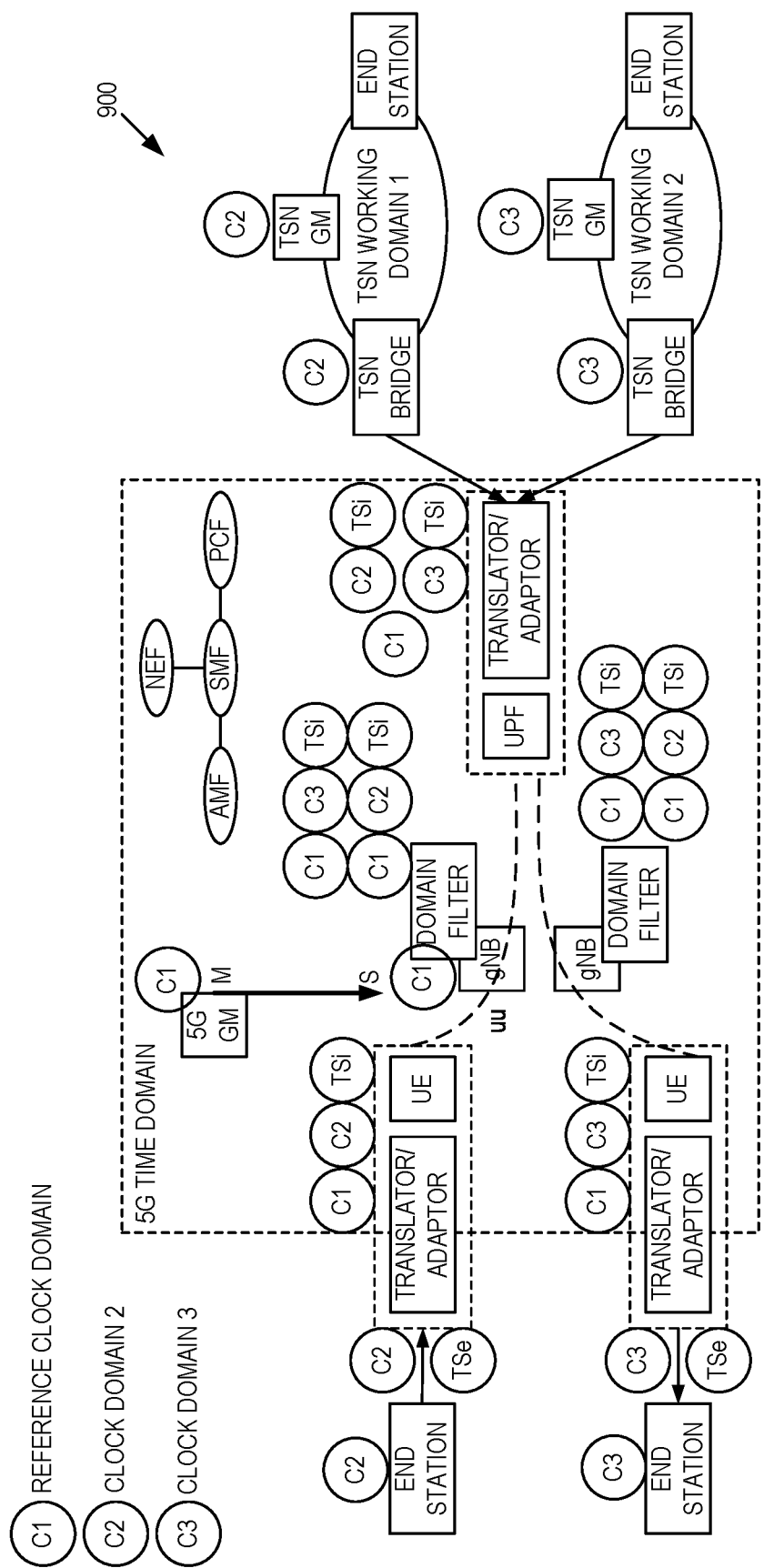
FIG. 9 illustrates one example of domain filtering at a base station in the 5GS in accordance with an embodiment of the present disclosure.

FIG. 8 illustrates one example of a user plane way to convey "wanted domainNumber(s)" in the 5GS in accordance with some embodiments of the present disclosure. Looking at FIG. 8, the procedure for conveying "wanted domainNumber(s)" via the user plane in 5GS in accordance with some embodiments of the present disclosure can be described as follows:

1. Left side of FIG. 8: During the device onboarding phase, a PDU session is established between the UE 212 and the UPF 314. End stations report to the UE/TT 504 about their "wanted domainNumber(s)".
2. The UE/TT 504 or UE 212 forwards (g)PTP announce message to the RAN and the UPF 314 via user plane. That is, the (g)PTP message format is intact and directly encapsulated into the user plane Protocol Data Unit (PDU) payload. The PDCP payload is a gPTP announce message.
   Variation 1: The UE/TT 504 terminates the Announce message and extracts "wanted domainNumbers(s)". Then, the UE/TT 504 sends the "wanted domain-Number(s)" in a user plane payload (e.g., PDCP payload is "wantedDomainNumber"). That is, in this variation, the (g)PTP message is terminated at the UE/TT 504.
   Variation 2: The UE/TT 504 extracts the "wanted domainNumber(s)" and inserts the information into a user plane packet header, e.g. PDCP header, GTP-U header. That is, in this variation, the (g)PTP message is terminated at the UE/TT 504.
   Variation 3: The UE/TT 504 extracts the "wanted domainNumber(s)" and sends the "wanted domain-Number(s)" in a user plane packet. That is, in this variation, the (g)PTP message format is intact, meanwhile the same information is also copied to the user plane packet header, e.g. PDCP header, GTP-U header.
   Variation 4: The Announce message that contains "wanted domainNumber(s)" can be in a QoS flow of a PDU session that can carry other non-gPTP Ethernet type user plane traffic, or it can use a dedicated PDU session or QoS flow within a PDU session for carrying the (g)PTP Ethernet type traffic (i.e., only clock information related Ethernet frames).
3. The "wanted domainNumber(s)" arrives at and is used by a user plane node(s), e.g., to perform filtering.
   Variation 1: The UPF 314 or UPF/TT 504 filters out the gPTP announce message from other user plane traffic in the same PDU session, then the UPF 314 or UPF/TT 504 extracts the UE specific "wanted domainNumber(s)" identified therein and terminates the Announce message. The UPF/TT 504 then only relays subsequent downlink gPTP messages to UEs having an interest in the specific clock domain indicated by that gPTP message.
   Variation 2: The UPF/TT 504 forwards the "wanted domainNumber(s)" to the SMF 308 or the PCF 310 via N4 session management procedures. In this case, the control plane nodes can have the "wanted domainNumber" information (see FIG. 6). Filtering of TSN clock domains can be performed according to the methods associated with FIG. 6.
   Variation 3: The RAN sniffs the "wanted domainNumber(s)", e.g. from the PDCP header, or extracts the domainNumber from user plane payload (i.e., from a gPTP announce message sent as user plane payload from the UE/TT 504 to the UPF 314).

In some embodiments, the SMF 308 may know how many "wanted domainNumbers" are needed for a given gNB (i.e., based on the SMF 308 knowing the set of UEs managed by a given gNB and their respective "wanted domain-Number(s)"), and therefore may send this information directly to the gNB. The gNB may then apply domain filtering based on this information. The domain filter at a gNB may differ from that at the other gNB(s).

FIG. 9 illustrates one example of domain filtering at a gNB 202. From right side of the FIG. 9, all TSN clocks for all domains are sent using gPTP messages from the UPF 314 to the RAN (i.e., to the gNB 202). The UPF 314 forwards the (g)PTP messages, including messages from different time domains, over a user plane GTP-U tunnel which already exists between the gNB 202 and the UPF 314. Normal handling in the UPF 314 applies (i.e., the GTP-U tunnel is associated with a PDU session that has already been established for the target UE 212 and deemed appropriate for conveying gPTP messages as user plane information).

The gNB 202 sniffs the gPTP messages extracted from the GTP-U PDUs and discards all of them that do not indicate a DomainNumber that the SMF 308 has indicated to be of interest to at least one UE/end station.

Embodiments that Address Problem #2

Figure 10:
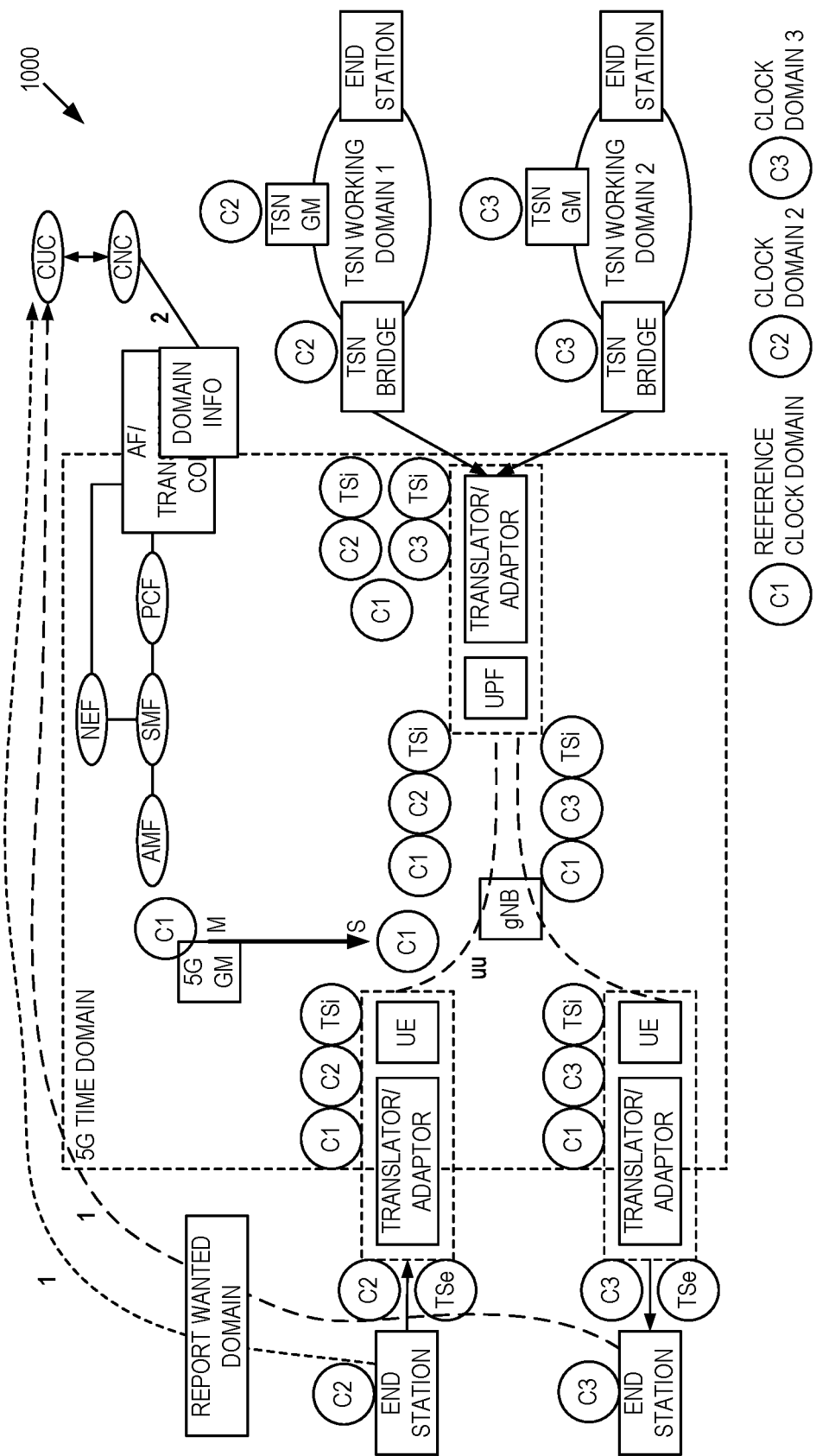
FIG. 10 illustrates a mechanism by which a 5GS obtains domain information from a centralized entity of a TSN network.

Instead of using (g)PTP announce message to carry the "wanted domainNumber(s)", there are other ways to deliver the "wanted domainNumber(s)".
1. The "wanted domainNumber(s)" can also be associated with a UE 212 to which the TSN end station(s) are connected. For example, this can be done using the UE's subscription. The number of end stations and their "wanted domainNumber(s)" are stored in, e.g., the UDM 306. During the end station and UE onboarding phase, the relevant 5GC network nodes, e.g. the SMF 308, can obtain the "wanted domainNumber(s)" and use this information at PDU Session setup or PDU Session modify for the PDU session between a UE 212 and a UPF 314, so that GTP-U PDUs only carrying gPTP messages associated with the "wanted domainNumber(s)" for that UE 212 are delivered inside the 5GS. That is, there is no need for the end station to report its interested time domain through the (g)PTP announce message.
2. The "wanted domainNumber(s)" can be delivered using IEEE 802.1Qcc fully centralized model or Centralized Network/distributed user model.
   a. In a fully centralized Qcc model (see, e.g., FIG. 10), the UE specific "wanted domainNumber(s)" can be reported to the "Centralized User Configuration" (CUC) (see, e.g., FIG. 10, step 1). The CUC can share the knowledge with the "Centralized Network Configuration" (CNC). The 5GS can then request the UE specific "wanted domainNumber(s)" from the CNC, e.g. via information sharing. The CNC can then relay the information to a 5GS control plane node (e.g., the SMF 308) via an AF (e.g., the TSN AF 302) (see, e.g., step 2 of FIG. 10), which relays it to the UPF 314 that has a function of the TSN control plane translator. In other words, in a fully centralized Qcc model, the UE specific "wanted domain-Number(s)" can be reported to the CUC/CNC. The CNC can communicate with the AF (TSN control plane translator) to share the "domain information". The AF then can forward this information to the PCF 310 or SMF 308 via the NEF 400. The steps performed following this can be the same as that for FIG. 7B.
   b. In a Centralized Network/distributed user model, according to IEEE 802.1Qcc, the end station exchanges information with a bridge using User/ Network Configuration Information (UNI). When the 5GS is connected to the end station, a "user/ network configuration" function can be part of the 5GS, e.g. in TT, where the TT communicates with end stations with UNI protocol. Another node in the 5GS may host the "user/network configuration" function too. In such a way, the UE specific "wanted domainNumber(s)" information can therefore be shared with the 5GS. For the uplink direction, the UE/TT 504 can forward the user specific "wanted domainNumber(s)" information using either control plane or user plane methods described in the section "Embodiments that Address Problem #1" above.

The signaling methods described here are not limited only for "wanted domainNumber(s)". The methods should apply for delivering other TSN related parameters inside the 5GS or between the 5GS and TSN network.

Embodiments that Address Problem #3

The 5GS signaling methods that are used to deliver "wanted domainNumber(s)" to relevant nodes are described herein. The signaling methods differ from case to case, i.e. when different nodes are to get the "wanted domain-Number(s)" information to perform the Domain filtering function. The signaling methods described here are not limited only for "wanted domainNumber(s)", the methods could apply for delivering other TSN related parameters inside the 5GS or between the 5GS and TSN network.

Additional Embodiments

A way of delivering a time difference between the TSN clock and the 5G clock (T_diff_upf) from the UPF/TT to the gNB is as follows. The UPF/TT receives a gPTP message used for providing TSN clock information. The UPF/TT uses the precise Origintimestamp and correction values included in the TSN clock information to produce/recover the TSN clock value. The UPF/TT takes an ingress timestamp based on the 5G clock for the same incoming gPTP message. The UPF/TT then calculates the time difference (offset) between the ingress timestamp based on the 5G clock and the recovered TSN clock value to provide T_diff_upf. This T_diff_upf value is communicated to the gNB. The delivery of this information inside the 5GS can use this same signaling method. For example, using a control plane based method, the T_diff_upf can be reported from the UPF 314 to the SMF 308 or PCF 310 via N4 session management procedure, then the SMF 308 can relay it to the AMF 300 and RAN (i.e., gNB 202) via NGAP. See, e.g., FIG. 11.

Figure 11:
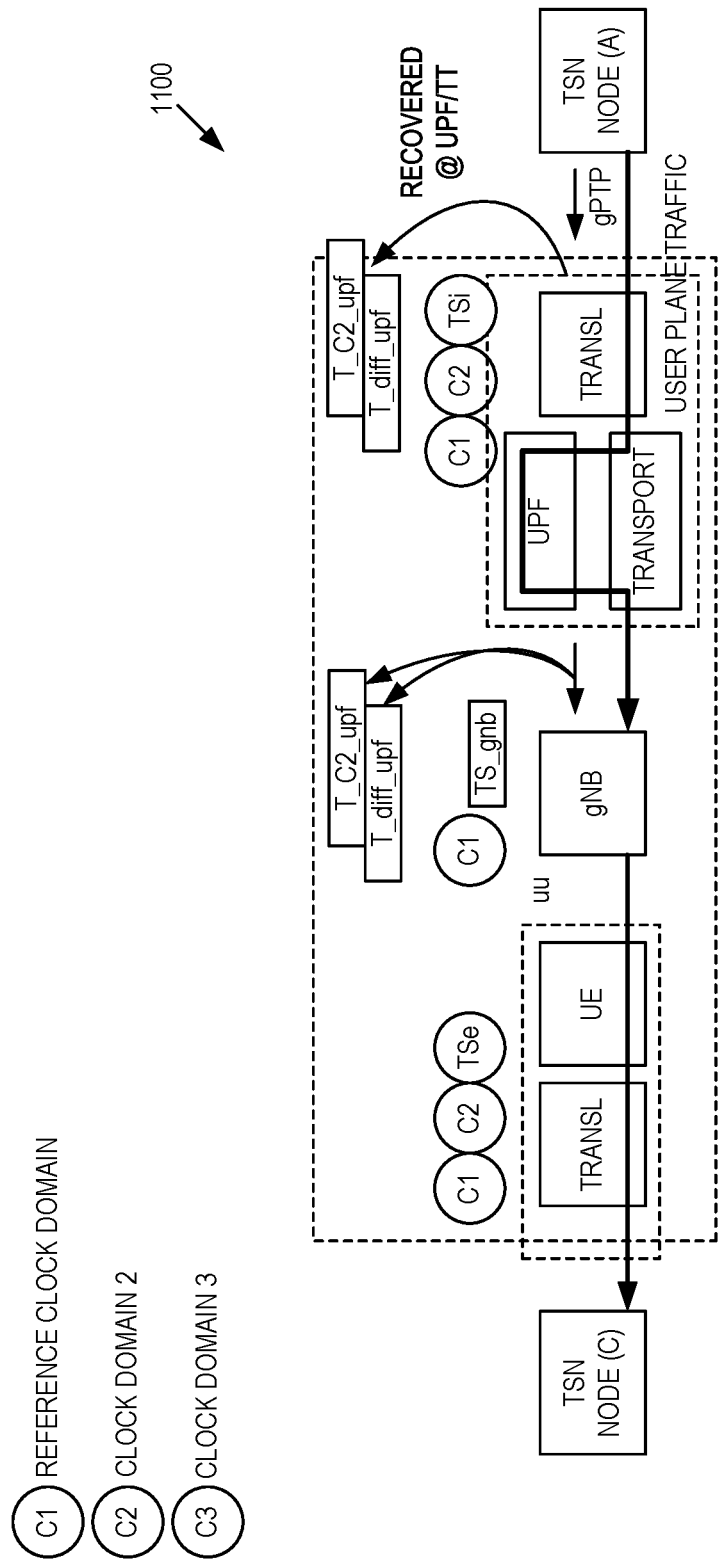
FIG. 11 illustrates a procedure by which a time difference between a TSN clock and a 5G clock can be signaled within a 5GS in accordance with an embodiment of the present disclosure.

Looking at FIG. 11, the procedure is as follows:
UPF/TT
1. Obtain T_C2_upf from the incoming gPTP message.
2. Timestamp gPTP message to obtain the ingress timestamp (TSi) (TSi made using C1).
3. Calculate T_diff_upf=TSi−T_C2_upf.
4. Add T_diff_upf into the gPTP message.
gNB
1. Timestamp a received gPTP message to obtain TS_gnb (TS_gnb made using C1).
2. Obtain T_diff_upf and T_C2_upf from gPTP message via message sniffing.
3. Calculate T_diff_gnb=TS_gnb−T_C2_upf.
4. Determine deltaT=T_diff_gnb−T_diff_upf.
5. Determine current time in TSN time domain as T_C2_gnb=T_C2_upf+deltaT.

Figure 12:
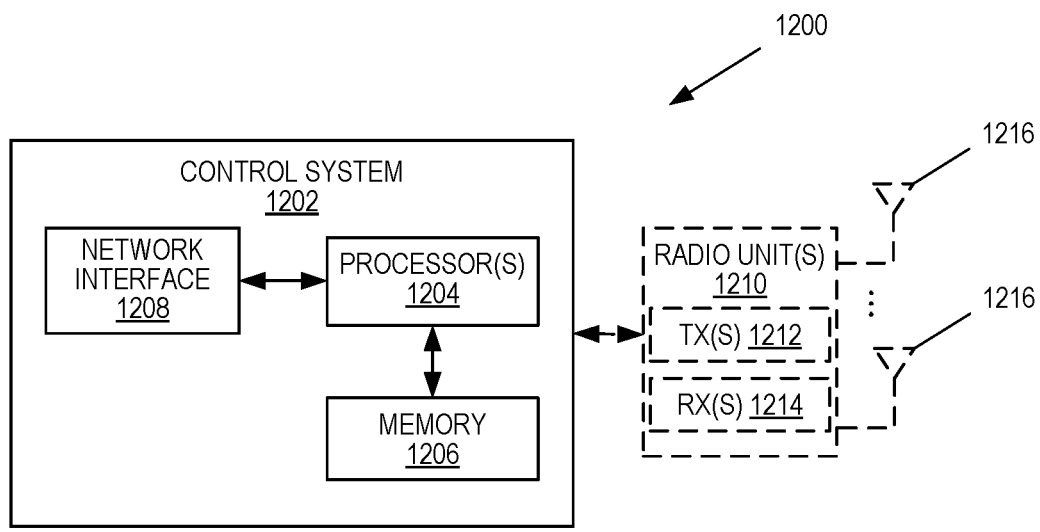
FIGS. 12 through 14 are schematic block diagrams of a network node.

FIG. 12 is a schematic block diagram of a network node 1200 according to some embodiments of the present disclosure. Optional components are represented here with dashed lines. The network node 1200 may be, for example, radio access node (e.g., a base station 202 or 206 such as the gNB 612) or a core network node (e.g., a node implementing a core network function such as, e.g., the UPF, a TT (e.g., UPF/TT), AMF, SMF, PCF, or AF). As illustrated, the network node 1200 includes a control system 1202 that includes one or more processors 1204 (e.g., Central Processing Units (CPUs), Application Specific Integrated Circuits (ASICs), Field Programmable Gate Arrays (FPGAs), and/or the like), memory 1206, and a network interface 1208. The one or more processors 1204 are also referred to herein as processing circuitry. In addition, if the network node 1200 is a radio access node, the network node 1200 also includes one or more radio units 1210 that each includes one or more transmitters 1212 and one or more receivers 1214 coupled to one or more antennas 1216. The radio units 1210 may be referred to or be part of radio interface circuitry. In some embodiments, the radio unit(s) 1210 is external to the control system 1202 and connected to the control system 1202 via, e.g., a wired connection (e.g., an optical cable). However, in some other embodiments, the radio unit(s) 1210 and potentially the antenna(s) 1216 are integrated together with the control system 1202. The one or more processors 1204 operate to provide one or more functions of a network node 1200 (e.g., a node implementing a core network function such as, e.g., the UPF, a TT (e.g., UPF/TT), AMF, SMF, PCF, or AF) as described herein. In some embodiments, the function(s) are implemented in software that is stored, e.g., in the memory 1206 and executed by the one or more processors 1204.

Figure 13:
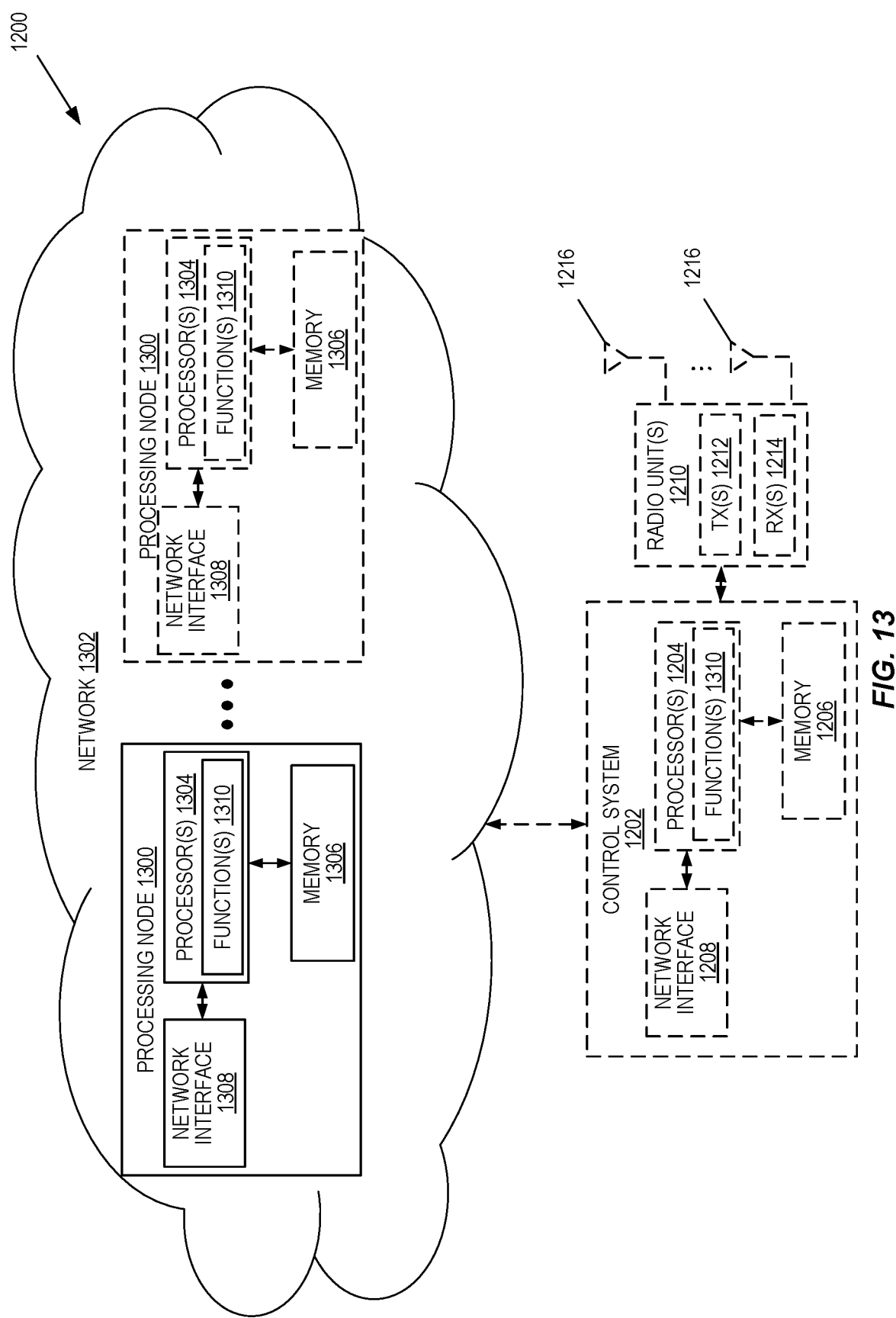

FIG. 13 is a schematic block diagram that illustrates a virtualized embodiment of the network node 1200 according to some embodiments of the present disclosure. Optional components are represented here with dashed lines. As used herein, a "virtualized" radio access node is an implementation of the network node 1200 in which at least a portion of the functionality of the network node 1200 is implemented as a virtual component(s) (e.g., via a virtual machine(s) executing on a physical processing node(s) in a network(s)). As illustrated, in this example, the network node 1200 includes one or more processing nodes 1300 coupled to or included as part of a network(s) 1302 via the network interface 1208. Each processing node 1300 includes one or more processors 1304 (e.g., CPUs, ASICs, FPGAs, and/or the like), memory 1306, and a network interface 1308. Optionally, the network node 1200 includes the control system 1202 that includes the one or more processors 1204 (e.g., CPUs, ASICs, FPGAs, and/or the like), the memory 1206, and the network interface 1208 and, if it is a radio access node, the one or more radio units 1210 that each includes the one or more transmitters 1212 and the one or more receivers 1214 coupled to the one or more antennas 1216, as described above. The control system 1202 is connected to the radio unit(s) 1210 via, for example, an optical cable or the like. If present, the control system 1202 is connected to the one or more processing nodes 1300.

In this example, functions 1310 of the network node 1200 described herein (e.g., one or more functions of a node implementing a core network function such as, e.g., the UPF, a TT (e.g., UPF/TT), AMF, SMF, PCF, or AF) are implemented at the one or more processing nodes 1300 or distributed across the control system 1202 and the one or more processing nodes 1300 in any desired manner. In some particular embodiments, some or all of the functions 1310 of the network node 1200 described herein are implemented as virtual components executed by one or more virtual machines implemented in a virtual environment(s) hosted by the processing node(s) 1300. As will be appreciated by one of ordinary skill in the art, additional signaling or communication between the processing node(s) 1300 and the control system 1202 is used in order to carry out at least some of the desired functions 1310. Notably, in some embodiments, the control system 1202 may not be included, in which case the radio unit(s) 1210 communicate directly with the processing node(s) 1300 via an appropriate network interface(s).

In some embodiments, a computer program including instructions which, when executed by at least one processor, causes the at least one processor to carry out the functionality of network node 1200 or a node (e.g., a processing node 1300) implementing one or more of the functions 1310 of the network node 1200 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
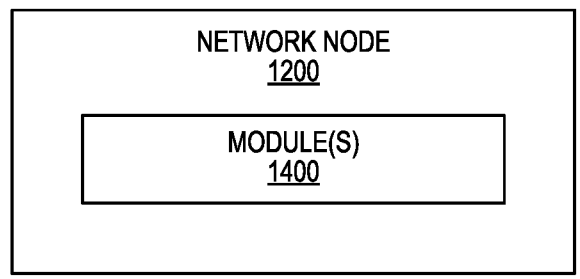

FIG. 14 is a schematic block diagram of the network node 1200 according to some other embodiments of the present disclosure. The network node 1200 includes one or more modules 1400, each of which is implemented in software. The module(s) 1400 provide the functionality of the network node 1200 described herein. This discussion is equally applicable to the processing node 1300 of FIG. 13 where the modules 1400 may be implemented at one of the processing nodes 1300 or distributed across multiple processing nodes 1300 and/or distributed across the processing node(s) 1300 and the control system 1202.

Figure 15:
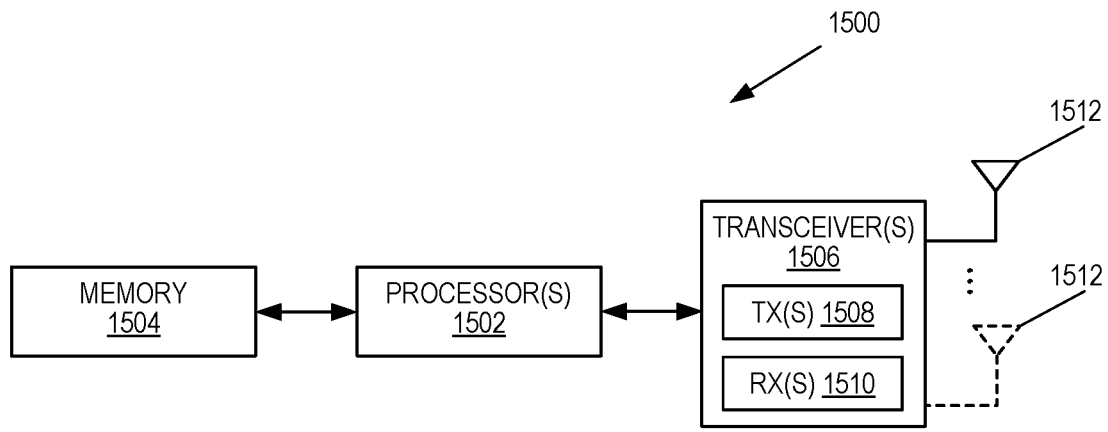
FIGS. 15 and 16 are schematic block diagrams of a UE.

FIG. 15 is a schematic block diagram of a UE 1500 according to some embodiments of the present disclosure. As illustrated, the UE 1500 includes one or more processors 1502 (e.g., CPUs, ASICs, FPGAs, and/or the like), memory 1504, and one or more transceivers 1506 each including one or more transmitters 1508 and one or more receivers 1510 coupled to one or more antennas 1512. The transceiver(s) 1506 includes radio front end circuitry connected to the antenna(s) 1512 that is configured to condition signals communicated between the antenna(s) 1512 and the processor(s) 1502, as will be appreciated by on of ordinary skill in the art. The processors 1502 are also referred to herein as processing circuitry. The transceivers 1506 are also referred to herein as radio circuitry. In some embodiments, the functionality of the UE 1500 described above (functionality of the UE/TT) may be fully or partially implemented in software that is, e.g., stored in the memory 1504 and executed by the processor(s) 1502. Note that the UE 1500 may include additional components not illustrated in FIG. 15 such as, e.g., one or more user interface components (e.g., an input/output interface including a display, buttons, a touch screen, a microphone, a speaker(s), and/or the like and/or any other components for allowing input of information into the UE 1500 and/or allowing output of information from the UE 1500), a power supply (e.g., a battery and associated power circuitry), etc.

In some embodiments, a computer program including instructions which, when executed by at least one processor, causes the at least one processor to carry out the functionality of the UE 1500 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 16:
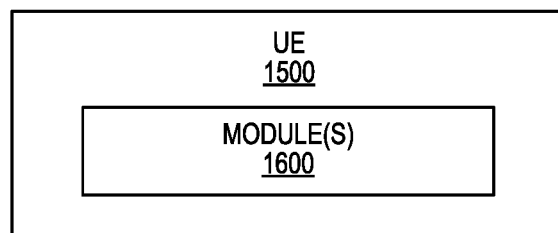

FIG. 16 is a schematic block diagram of the UE 1500 according to some other embodiments of the present disclosure. The UE 1500 includes one or more modules 1600, each of which is implemented in software. The module(s) 1600 provide the functionality of the UE 1500 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows.

Embodiment 1: A method performed by a User Equipment, UE, in a cellular communications system or a Time Sensitive Network, TSN, Translator, TT, associated with the UE, the method comprising: receiving, from a TSN end station, a (generalized) Precision Time Protocol, (g)PTP, announce message comprising information that identifies one or more clock domains for which the TSN end station desires to receive (g)PTP messages; and sending, to a core network node in the cellular communications system, either: (a) the information that identifies the one or more clock domains extracted from the (g)PTP message or (b) the (g)PTP announce message.

Embodiment 2: The method of embodiment 1 wherein the information that identifies the one or more clock domains comprises one or more wanted domainNumbers.

Embodiment 3: The method of any one of embodiments 1 to 2 wherein sending either (a) or (b) comprises sending either (a) or (b) via either control plane signaling or a user plane message(s).

Embodiment 4: The method of any one of embodiments 1 to 3 further comprising: extracting the information that identifies the one or more clock domains from the (g)PTP announce message; wherein sending either (a) or (b) comprises sending the information that identifies the one or more clock domains extracted from the (g)PTP message.

Embodiment 5: The method of embodiment 4 wherein the UE or TT terminates the (g)PTP announce message.

Embodiment 6: The method of embodiment 4 or 5 wherein sending the information that identifies the one or more clock domains extracted from the (g)PTP message comprises sending the information that identifies the one or more clock domains extracted from the (g)PTP message via control plane signaling in a new information element.

Embodiment 7: The method of embodiment 4 or 5 wherein sending the information that identifies the one or more clock domains extracted from the (g)PTP message comprises sending the information that identifies the one or more clock domains extracted from the (g)PTP message in a payload of a user plane message.

Embodiment 8: The method of embodiment 4 or 5 wherein sending the information that identifies the one or more clock domains extracted from the (g)PTP message comprises sending the information that identifies the one or more clock domains extracted from the (g)PTP message in a header of a user plane message.

Embodiment 9: The method of any one of embodiments 1 to 3 wherein sending either (a) or (b) comprises sending (b) via control plane signaling.

Embodiment 10: The method of any one of embodiments 1 to 3 wherein sending either (a) or (b) comprises: encapsulating the (g)PTP announce message into a user plane PDU payload of a user plane message; and sending the user plane message.

Embodiment 11: A User Equipment, UE, for a cellular communications system or a Time Sensitive Network, TSN, Translator, TT, associated with the UE, adapted to perform the method of any one of embodiments 1 to 10.

Embodiment 12: A method performed by a network node of a cellular communications system that operates to provide support for one or more virtual Time Sensitive Network, TSN, nodes, the method comprising: obtaining information that identifies one or more clock domains for which a TSN end station desires to receive, via a User Equipment, UE, and/or TSN Translator, TT, associated with the UE, (generalized) Precision Time Protocol, (g)PTP, messages; and performing one or more actions using the obtained information.

Embodiment 13: The method of embodiment 12 wherein performing the one or more actions comprises providing the information to another network node.

Embodiment 14: The method of embodiment 12 wherein performing the one or more actions comprises performing clock domain filtering of (g)PTP messages such that only (g)PTP messages of the one or more desired clock domains are delivered to the UE.

Embodiment 15: The method of embodiment 12 wherein the network node is a Session Management Function, SMF, or Policy Control Function, PCF, and performing the one or more actions comprises modifying a corresponding Protocol Data Unit, PDU, session such that a corresponding User Plane Function, UPF, only routes (g)PTP messages of the one or more desired clock domains to the UE or TT associated with the TSN end station.

Embodiment 16: The method of embodiment 12 wherein the network node is a Session Management Function, SMF, or Policy Control Function, PCF, and performing the one or more actions comprises sending the information to a corresponding User Plane Function, UPF.

Embodiment 17: The method of embodiment 12 wherein the network node is a Session Management Function, SMF, and performing the one or more actions comprises instructing a corresponding User Plane Function, UPF, to forward (g)PTP messages to a corresponding base station using a dedicated tunnel between the base station and the UPF.

Embodiment 18: The method of embodiment 12 wherein the network node is base station, and performing the one or more actions comprises performing clock domain filtering of (g)PTP messages at the base station.

Embodiment 19: The method of embodiment 12 wherein the network node is a User Plane Function, UPF, and performing the one or more actions comprises performing clock domain filtering of (g)PTP messages at the UPF.

Embodiment 20: The method of embodiment 12 wherein the network node is a User Plane Function, UPF, and performing the one or more actions comprises sending the information to another network node.

Embodiment 21: The method of any one of embodiments 12 to 20 wherein obtaining the information comprises obtaining the information from a Centralized Network Configuration, CNC, of an associated TSN.

Embodiment 22: The method of any one of embodiments 12 to 20 wherein obtaining the information comprises receiving either: a control plane signaling message comprising the information or a user plane message comprising the information.

Embodiment 23: The method of any one of embodiments 12 to 20 wherein obtaining the information comprises receiving a control plane signaling message comprising a (g)PTP announce message, wherein the (g)PTP announce message comprises the information that identifies the one or more clock domains for which the TSN end station desires to receive (g)PTP messages.

Embodiment 24: The method of any one of embodiments 12 to 20 wherein obtaining the information comprises receiving a user plane message comprising the information in a payload of the user plane message.

Embodiment 25: The method of any one of embodiments 12 to 20 wherein obtaining the information comprises receiving a user plane message comprising the information in a header of the user plane message.

Embodiment 26: A network node adapted to perform the method of any one of embodiments 12 to 25.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
ASIC Application Specific Integrated Circuit
AUSF Authentication Server Function
BMCA Best Master Clock Algorithm
CNC Centralized Network Configuration
CPU Central Processing Unit
CR Change Request
CUC Centralized User Configuration
DN Data Network
DRB Data Radio Bearer
DSP Digital Signal Processor
DS-TT Device Side Time Sensitive Networking Translator
eNB Enhanced or Evolved Node B FPGA Field Programmable Gate Array
gNB New Radio Base Station
GPRS General Packet Radio Service
gPTP Generalized Precision Time Protocol
GTP General Packet Radio Service Tunneling Protocol
GTP-U General Packet Radio Service Tunneling Protocol User Data
HSS Home Subscriber Server
IE Information Element
IP Internet Protocol
LTE Long Term Evolution
MME Mobility Management Entity
MTC Machine Type Communication
NAS Non-Access Stratum
NEF Network Exposure Function
NF Network Function
NGAP Next Generation Application Protocol
NR New Radio
NRF Network Repository Function
NSSF Network Slice Selection Function
NW-TT Network Side Time Sensitive Networking Translator
PCF Policy Control Function
PDCP Packet Data Convergence Protocol
PDU Protocol Data Unit
P-GW Packet Data Network Gateway
PTP Precision Time Protocol
QoS Quality of Service
RAM Random Access Memory
RAN Radio Access Network
ROM Read Only Memory
RRC Radio Resource Control
RRH Remote Radio Head
RU Round Trip Time
SCEF Service Capability Exposure Function
SIB System Information Block
SMF Session Management Function
TR Technical Report
TS Technical Specification
TSe Egress Timestamp
TSi Ingress Timestamp
TSN Time Sensitive Networking
TT Time Sensitive Networking Translator
UDM Unified Data Management
UE User Equipment
UNI User/Network Configuration Information
UPF User Plane Function Those skilled in the art will recognize improvements and modifications to the embodiments of the present disclosure. All such improvements and modifications are considered within the scope of the concepts disclosed herein.

What is claimed is:

1. A method performed by a User Equipment (UE) in a cellular communications system or a Time Sensitive Networking (TSN) Translator (TT) associated with the UE, the method comprising:
   receiving, from a TSN end station, a Precision Time Protocol (PTP) or Generalized PTP (gPTP) announce message comprising information, the information identifies one or more clock domains, wherein the identified one or more clock domains are domains for which the TSN end station desires to receive PTP or gPTP messages; and
   sending, to a core network node in the cellular communications system the information that identifies the one or more clock domains extracted from the PTP or gPTP announce message.

2. The method of claim 1, wherein the information that identifies the one or more clock domains comprises one or more wanted domain numbers that identify the one or more clock domains for which the TSN end station desires to receive PTP or gPTP messages.

3. The method of claim 1, wherein sending the information comprises sending the information via either control plane signaling or a user plane message.

4. The method of claim 1, further comprising:
   extracting the information that identifies the one or more clock domains from the PTP or gPTP announce message.

5. The method of claim 4, wherein the UE or TT terminates the PTP or gPTP announce message.

6. The method of claim 4, wherein sending the information that identifies the one or more clock domains extracted from the PTP or gPTP message comprises sending the information that identifies the one or more clock domains extracted from the PTP or gPTP message via control plane signaling in a new information element.

7. The method of claim 4, wherein sending the information that identifies the one or more clock domains extracted from the PTP or gPTP message comprises sending the information that identifies the one or more clock domains extracted from the PTP or gPTP message in one of a payload of a user plane message or a header of a user plane message.

8. The method of claim 1, wherein the method further comprises sending the PTP or gPTP announce message, wherein sending the PTP or gPTP announce message comprises:
   encapsulating the PTP or gPTP announce message into a user plane Protocol Data Unit (PDU) payload of a user plane message; and
   sending the user plane message.

9. A node, for a cellular communications system that operates as a virtual Time Sensitive Network (TSN) bridge node, being either a User Equipment (UE) or a TSN Translator (TT) at the UE, the node comprising:
   processing circuitry adapted to cause the node to:
      receive, from a TSN end station, a Precision Time Protocol (PTP) or Generalized PTP (gPTP) announce message comprising information, the information identifies one or more clock domains, wherein the identified one or more clock domains are domains for which the TSN end station desires to receive PTP or gPTP messages; and
      send, to a core network node in the cellular communications system the information that identifies the one or more clock domains extracted from the PTP or gPTP announce message.

* * * * *